US010004993B2

United States Patent
Navok et al.

(10) Patent No.: US 10,004,993 B2
(45) Date of Patent: Jun. 26, 2018

(54) GAME SYSTEM INCLUDING THIRD PARTY CONTROL

(71) Applicant: SQUARE ENIX HOLDINGS CO., LTD., Tokyo (JO)

(72) Inventors: Jacob Navok, Stamford, CT (US); Yoichi Wada, Tokyo (JP)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 0 days. days.

(21) Appl. No.: 15/838,783

(22) Filed: Dec. 12, 2017

(65) Prior Publication Data

US 2018/0111052 A1    Apr. 26, 2018

Related U.S. Application Data

(63) Continuation of application No. 14/854,232, filed on Sep. 15, 2015, now Pat. No. 9,873,055.

(51) Int. Cl.
| | |
|---|---|
| A63F 13/30 | (2014.01) |
| A63F 13/86 | (2014.01) |
| A63F 13/847 | (2014.01) |
| A63F 13/5252 | (2014.01) |
| A63F 13/355 | (2014.01) |

(52) U.S. Cl.
CPC ............ *A63F 13/86* (2014.09); *A63F 13/355* (2014.09); *A63F 13/5252* (2014.09); *A63F 13/847* (2014.09)

(58) Field of Classification Search
CPC .... A63F 13/86; A63F 13/355; A63F 13/5252; A63F 13/847
USPC .......................................................... 463/31
See application file for complete search history.

(56) References Cited

U.S. PATENT DOCUMENTS

| | | |
|---|---|---|
| 6,758,746 B1 | 7/2004 | Hunter et al. |
| 6,999,083 B2 | 2/2006 | Wong et al. |
| 7,446,772 B2 | 11/2008 | Wong et al. |
| 7,458,894 B2 | 12/2008 | Danieli et al. |
| 7,632,186 B2 | 12/2009 | Spanton et al. |

(Continued)

FOREIGN PATENT DOCUMENTS

WO    2015/023564    2/2015

OTHER PUBLICATIONS

U.S. Appl. No. 14/854,284 to Philippe Malenfant, filed Sep. 15, 2015.

(Continued)

*Primary Examiner* — Allen Chan
(74) *Attorney, Agent, or Firm* — Greenblum & Bernstein, P.L.C.

(57) ABSTRACT

Methods, systems, devices, and media for controlling a network game in accordance with an input of at least one game spectator are provided. A network interface receives controller input information from at least one game player and game spectator input information based on the input of the game spectator. The network game is progressed in accordance with the controller input information received by the network interface from the game player, and an aspect of the network game is controlled in accordance with the game spectator input information received by the network interface. The game player executes a game client that establishes a connection with the game system for transmitting the controller input information to the network interface. The game spectator does not execute the game client.

20 Claims, 14 Drawing Sheets

(56) References Cited

U.S. PATENT DOCUMENTS

| | | |
|---|---|---|
| 7,695,369 B2 | 4/2010 | Winkler |
| 7,974,902 B2 | 7/2011 | Van Luchene |
| 8,025,572 B2 | 9/2011 | Spanton et al. |
| 8,366,546 B1 | 2/2013 | Naik et al. |
| 8,409,010 B2 | 4/2013 | Clowes et al. |
| 8,475,284 B1 | 7/2013 | Rudi et al. |
| 8,628,424 B1 | 1/2014 | Kern et al. |
| 8,636,589 B2 | 1/2014 | Harris et al. |
| 8,874,661 B2 | 10/2014 | Wild et al. |
| 8,888,601 B2 | 11/2014 | Vogel et al. |
| 2003/0220143 A1 | 11/2003 | Shteyn et al. |
| 2004/0143852 A1 | 7/2004 | Meyers |
| 2008/0026838 A1 | 1/2008 | Dunstan et al. |
| 2008/0287193 A1 | 11/2008 | Lee et al. |
| 2009/0209348 A1 | 8/2009 | Roberts et al. |
| 2011/0263333 A1 | 10/2011 | Dokei et al. |
| 2012/0094737 A1 | 4/2012 | Barclay et al. |
| 2013/0288799 A1 | 10/2013 | Harris |
| 2014/0004951 A1 | 1/2014 | Kern et al. |
| 2014/0031121 A1 | 1/2014 | Kern et al. |
| 2014/0357350 A1 | 12/2014 | Weingardt et al. |
| 2015/0231506 A1 | 8/2015 | Webb et al. |
| 2015/0251095 A1 | 9/2015 | Perrin |
| 2017/0072323 A1 | 3/2017 | Malenfant |
| 2017/0072324 A1 | 3/2017 | Navok et al. |

OTHER PUBLICATIONS

U.S. Appl. No. 14/854,312 to Jacob Navok et al., filed Sep. 15, 2015.

Yee, Nick. "The psychology of massively multi-user online role-playing games: Motivations, emotional investment, relationships and problematic usage." Avatars at work and play. Springer Netherlands, 2006. Available at: http://web.science.mq.edu.au/~isvr/Documents/pdf%20files/game-master/Yee_Book_Chapter.pdf.

Reeves, Stuart, et al. "Designing the spectator experience." Proceedings of the SIGCHI conference on Human factors in computing systems. ACM, 2005. Available at: http://eprints.nottingham.ac.uk/252/1/p133-reeves.pdf.

Kattwinkel, Susan. "Audience participation: Essays on inclusion in performance. No. 101. Greenwood Publishing Group, 2003. Audience Participation: Essays on Inclusion in Performance." Greenwood Publishing Group, pp. 126 2003. Available at: https://books.google.com/books?id=VfC5OLyRZA8C&pg=PA126&lpg=PA126&dq=online+multi-user+game+(audience+OR+observer+OR+3rd-party+OR+third-party)+(input+OR+control+OR+participation)&source=bl&ots=NMqSL3GCS1&sig=a8IWrvwPkj0oHO7ei9ND8ZUDAs4&hl=en&sa=X&ei=GgaLVeWmJISy-AGU0ID4DQ&ved=0CB8Q6AEwAA#v=onepage&q=online%20multi-user%20game%20(audience%20OR%20observer%20OR%203rd-party%20OR%20third-party)%20(input%20OR.

Finke, Matthias, et al. "Lessons learned: game design for large public displays. "Proceedings of the 3rd international conference on Digital Interactive Media in Entertainment and Arts. ACM, pp. 26-33, 2008. Available at: http://citeseerx.ist.psu.edu/viewdoc/download?doi=10.1.1.161.6376&rep=rep1&type=pdf.

Cole, Helena, and Mark D. Griffiths. "Social interactions in massively multiplayer online role-playing gamers." CyberPsychology & Behavior 10.4, pp. 575-583 (2007). Available at: http://www.researchgate.net/profile/Mark_Griffiths2/publication/6129334_Social_interactions_in_massively_multiplayer_online_role-playing_gamers/links/0fcfd50bba408275ca000000.pdf.

GAME SYSTEM INCLUDING THIRD PARTY CONTROL

CROSS-REFERENCE TO RELATED APPLICATIONS

This is a continuation application of U.S. patent application Ser. No. 14/854,232, filed Sep. 15, 2015. The disclosure of this document, including the specification, drawings, and claims, is incorporated herein by reference in its entirety.

BACKGROUND

1. Field of the Disclosure

The present disclosure generally relates to the field of network gaming. More particularly, the present disclosure relates to various systems, methods, and media for controlling a network game in accordance with inputs of game spectators.

2. Background Information

Recently, electronic gaming has become accepted as a new variety of sport or, more appropriately, an e-sport. The acceptance of gaming as an e-sport has given rise to increasingly larger and more popular gaming events, such as the Evolution Championship Series. These events have created a significant viewing interest.

In order to satisfy the viewing interest, electronic game players have resorted to gamecasting. Gamecasting is an activity during which a game player broadcasts a live stream of his or her own game screen, typically using a screen capture application. The live stream is broadcast via the Internet or other network to enable third parties to view or watch the player's game play during real-time.

While traditional methods of gamecasting have provided a medium for viewing electronic gaming, the third parties are typically limited to viewing the game screens of the game players. In this regard, the traditional methods do not provide a viewing experience which is unique from the game players and also do not provide any feeling of necessity amongst the third parties. As such, new and improved methods for viewing network games are desired

SUMMARY OF THE DISCLOSURE

The present disclosure, through one or more of its various aspects, embodiments, and/or specific features or sub-components, provides, inter alia, various systems, servers, methods, media, and programs for controlling a network game in accordance with an input of a game spectator.

According to a non-limiting embodiment of the present disclosure, a game system for controlling a network game in accordance with an input of at least one game spectator is provided. The game system includes a network interface that receives controller input information from at least one game player and game spectator input information based on the input of the at least one game spectator. The game system also includes a processor and a memory that includes a game program including a set of instructions that, when executed by the processor, causes the processor to perform operations including progressing the network game in accordance with the controller input information received by the network interface from the at least one game player, and controlling an aspect of the network game in accordance with the game spectator input information received by the network interface. The at least one game player executes a game client that establishes a connection with the game system for transmitting the controller input information to the network interface. The at least one game spectator does not execute the game client.

According to one aspect of the present disclosure, the operations further include transmitting a request for the game spectator input information. The game spectator input information is received by the network interface in response to the request.

According to another aspect of the present disclosure, the game system further includes a game server that includes the network interface, the processor, and the memory. The game system also includes a rendering server that receives game information from the game server, generates a player game screen for the at least one game player, and generates a spectator game screen for the at least one game spectator. The game system even further includes a broadcaster that receives the spectator game screen from the rendering server and transmits the spectator game screen to a display interface. The display interface is accessible to the at least one game spectator for viewing the spectator game screen. The player game screen is transmitted to the at least one game player for display by the at least one game player. The request for the game spectator input information is transmitted to the display interface for display in association with the spectator game screen. The input of the at least one game spectator is received via the display interface.

According to yet another aspect of the present disclosure, the game server, the rendering server, and the broadcaster do not transmit any game data to the at least one game spectator.

According to still another aspect of the present disclosure, the game server, the rendering server, and the broadcaster do not receive the input of the at least one game spectator.

According to an additional aspect of the present disclosure, the spectator game screen is a global view of a game space of the network game, and the global view is different than the player game screen of the at least one game player.

According to another aspect of the present disclosure, the operations further include managing a dummy player that does not correspond to any of the at least one game player, and transmitting game information for the dummy player to the rendering server. The rendering server generates the spectator game screen based on the game information for the dummy player.

According to yet another aspect of the present disclosure, the game system includes the display interface that receives the spectator game screen from the broadcaster and the request for the game spectator input information from the game server. The display interface displays the spectator game screen in association with the request for the game spectator input information.

According to still another aspect of the present disclosure, the display interface is accessible via a network, and the display interface receives inputs from a plurality of game spectators in response to the request for the game spectator input information. One of the game server and the display interface processes the inputs according to a predetermined criterion to determine the game spectator input information.

According to an additional aspect of the present disclosure, the display interface provides a unicast transmission including the spectator game screen and the game spectator input information to each of the plurality of game spectators.

According to another aspect of the present disclosure, the display interface provides the unicast transmission to each of the plurality of game spectators in response to each of the plurality of game spectators satisfying a predetermined condition.

According to yet another aspect of the present disclosure, the display interface simultaneously provides a multicast transmission including the spectator game screen and the game spectator input information to each of the plurality of game spectators.

According to still another aspect of the present disclosure, the network interface receives inputs from a plurality of game spectators in response to the request for the game spectator input information, and the processor processes the inputs according to a predetermined criterion to determine the game spectator input information.

According to an additional aspect of the present disclosure, the request for the game spectator input information is valid for a predetermined period. The predetermined period is defined by at least one of a predetermined timeframe and a predetermined number of spectator inputs.

According to another aspect of the present disclosure, the game spectator input information is received by the network interface via a website. The website receives the input of the at least one game spectator.

According to yet another aspect of the present disclosure, each of the at least one game player controls a player character in the network game, and each of the at least one game spectator does not control any character in the network game.

According to another non-limiting embodiment of the present disclosure, a method for controlling a network game hosted by a game system in accordance with an input of at least one game spectator is provided. The method includes the features of receiving, by a network interface, controller input information from at least one game player, and receiving, by the network interface, game spectator input information based on the input of the at least one game spectator. The method further includes the features of controlling, by a processor, a progress of the network game in accordance with the controller input information received by the network interface from the at least one game player, and controlling, by the processor, an aspect of the network game in accordance with the game spectator input information received by the network interface. The at least one game player executes a game client that establishes a connection with the game system for transmitting the controller input information to the network interface. The at least one game spectator does not execute the game client.

According to an aspect of the present disclosure, the method further includes the features of generating, by the processor, a request for the game spectator input information, and generating, by a rendering server, a spectator game screen for the at least one game spectator. The request for the game spectator input information and the spectator game screen are transmitted to a display interface. The display interface displays the game spectator input information in association with the spectator game screen and is accessible to the at least one game spectator. The game spectator input information is received by the network interface via the display interface.

According to yet another non-limiting embodiment of the present disclosure, a non-transitory computer readable medium including a program for controlling a network game hosted by a game system in accordance with an input of at least one game spectator is provided. The program, when executed by at least one processor of the game system, causes the game system to perform operations including receiving, by a network interface, controller input information from at least one game player, and receiving, by the network interface, game spectator input information based on the input of the at least one game spectator. The operations further include controlling, by the at least one processor, a progress of the network game in accordance with the controller input information received by the network interface from the at least one game player, and controlling, by the at least one processor, an aspect of the network game in accordance with the game spectator input information received by the network interface. The at least one game player executes a game client that establishes a connection with the game system for transmitting the controller input information to the network interface. The at least one game spectator does not execute the game client.

According to an aspect of the present disclosure, the operations further include generating, by the at least one processor, a request for the game spectator input information, and generating, by a rendering server, a spectator game screen for the at least one game spectator. The request for the game spectator input information and the spectator game screen are transmitted to a display interface. The display interface displays the game spectator input information in association with the spectator game screen and is accessible to the at least one game spectator. The game spectator input information is received by the network interface via the display interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure provides various network game systems, devices, methods, media, and programs for controlling a network game in accordance with an input of at least one game spectator.

Figure 1:
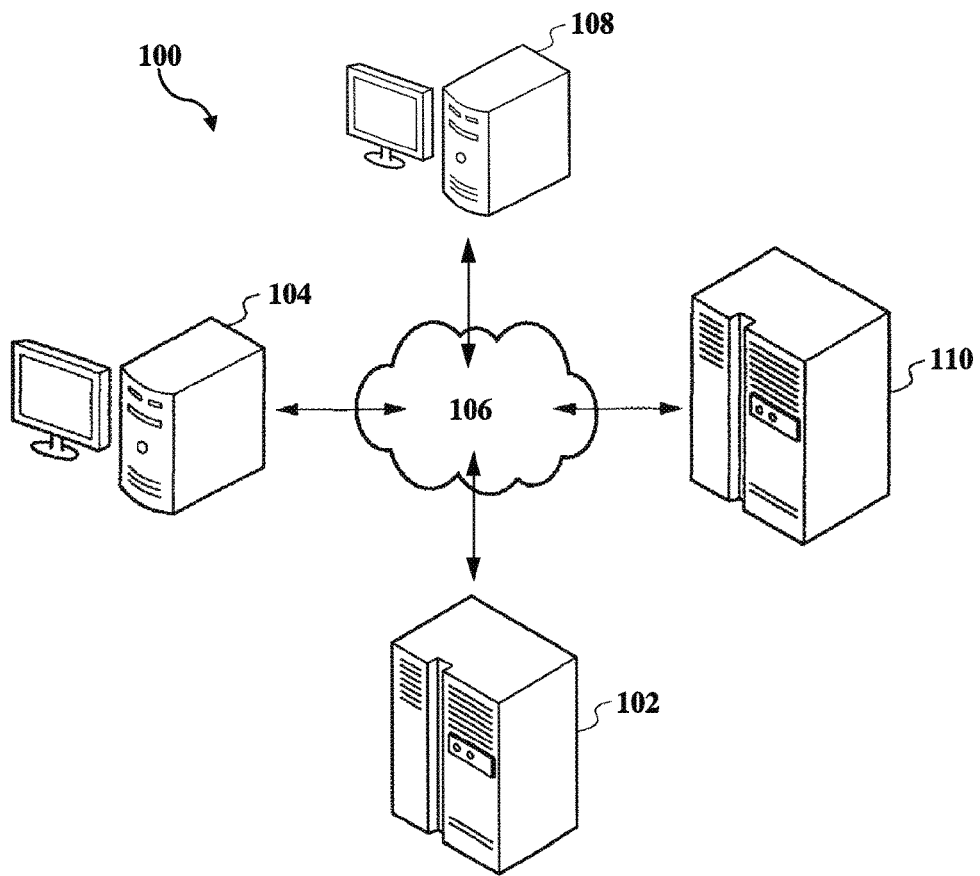
FIG. 1 shows an exemplary system for controlling a network game in accordance with inputs of game spectators, according to an aspect of the present disclosure.

An exemplary embodiment of a network game system is generally shown in FIG. 1 at 100. The network game system 100 includes a game system 102 to which at least one game player 104 is connected via a network 106. The game system 102 receives controller input information from the game player 104 and progresses the network game in accordance with the controller input information. The game system 102 also receives game spectator input information based on an input of at least one game spectator 108 and controls an aspect of the network game in accordance with the game spectator input information. The game player 104 executes a game client that establishes a connection with the game system 102 for transmitting the controller input information via the network 106, while the game spectator 108 does not execute the game client For example, the game system 102 may generate a request for the game spectator input information, and also generate a spectator game screen for the game spectator 108. The request for the game spectator input information and the spectator game screen are transmitted to a display interface 110, such as a webserver or website. The display interface 110 displays the game spectator input information in association with the spectator game screen and is accessible to the game spectator 108 via the network 106. By this means, the network interface 110 receives the input of the game spectator 108, and the game system 102 receives the game spectator input information via the display interface 110.

Accordingly, the game system 102 is configured to broadcast the spectator game screen to the network interface 110, such as via a server-side broadcaster, together with the request for the game spectator input information. As a result, the game spectator 108 may both watch and control an aspect of the network game without executing a game client, e.g., via the network interface 110. Thus, the game spectator 108 may experience the network game without requiring the game client. The game spectator 108 may also feel a sense of participation in the network game by providing the input to the network interface 110 to control the aspect of the game, thereby enhancing an interest in the network game.

In addition, since the spectator game screen is generated by the game server 102 and provided to the display interface 110, e.g., via the server-side broadcaster, the game spectator 108 is able to follow a broadcast of the network game and provide the control of the aspect without following any particular game player 104. Moreover, since the spectator game screen is again generated by the game system 102 instead of the game player 104, the spectator game screen is not limited to comprising a single view as in traditional broadcasting applications. According to these features, the game spectator 108 need not be associated with or follow any particular game player 104, and thus, a broader audience for the game spectator 108 may be targeted while a more diverse game viewing environment may also be provided.

Even further, the spectator game screen is not limited by the information which may be displayed therein or in connection therewith. For example, the spectator game screen may include the request for the game spectator input information, which is not limited by the content thereof, as well as additional game information regarding the game player 104 or a state of the network game which is not feasible with traditional, player-side broadcasting applications. In other words, the spectator game screen may include information which is not readily apparent to player-side game screens. The spectator game screen may include, for example, inputs and input-combinations of game players such that the spectator game screen may function as a teaching or learning application while still providing the control of the aspect of the network game to the game spectator 108. The request for the game spectator input information may include, for example, requests regarding future events or non-existent or hidden items in the network game. As a result, an interest in the spectator game screen may be enhanced by the broad possibilities as well as the dual functionality of learning and control.

Still further, the spectator game screen and the request for the game spectator input information are limited by any graphics processing or display capabilities of the game player 104, but rather, may be provided to the display interface 110 in accordance with the capabilities of the game system 102.

Of course, the above-described features and advantages are not limiting or exhaustive. Additional features and advantages of the network game system 100 will be apparent from the following description and embodiments. Accordingly, in view of the foregoing, the present disclosure, through one or more of its various aspects, embodiments, and/or specific features or sub-components, is thus intended to bring out one or more of the advantages as specifically discussed above and noted below.

Figure 2:
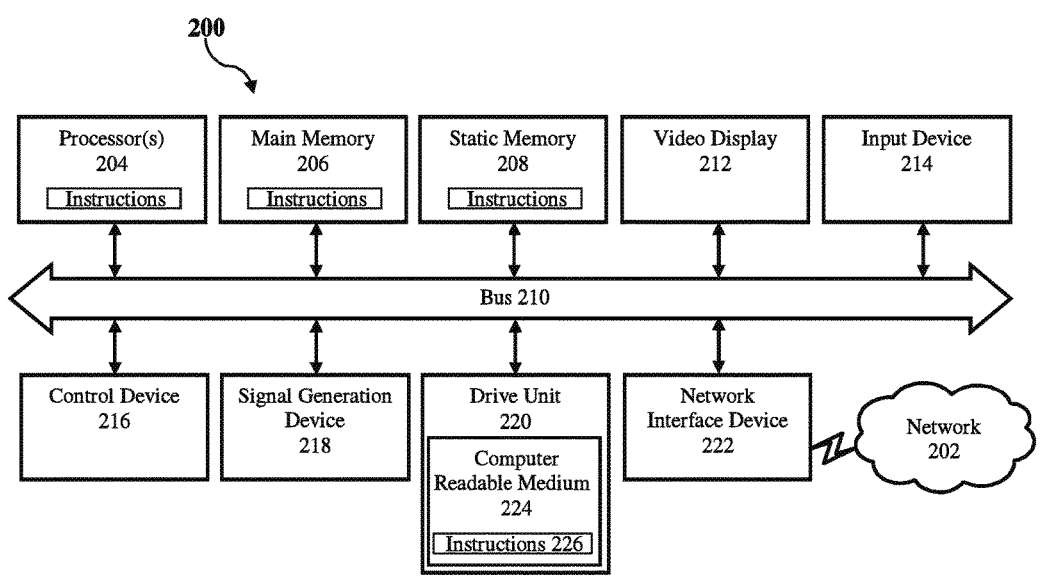
FIG. 2 shows a schematic of an exemplary game system, according to an aspect of the present disclosure.

An exemplary embodiment of the game system 102 is generally shown at 200 in FIG. 2. The exemplary game system 200 of FIG. 2 is hereinafter referred to as computer system 200 for convenience. The computer system 200 may include a set of instructions that can be executed to cause the computer system 200 to perform any one or more of the methods or computer based functions disclosed herein. The computer system 200 may operate as a standalone device or may be connected, for example, using a network 202, to other computer systems or peripheral devices such as the game player 104, the display interface 110, and the game spectator 108.

In a networked deployment, the computer system 200 may operate in the capacity of a server or as a client user computer in a server-client user network environment, a client user computer in cloud computing environment, or as a peer computer system in a peer-to-peer (or distributed) network environment. The computer system 200 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 200 may be implemented as, or incorporated into, an automobile or a wearable device, such as, but not limited to, watches, glasses, bracelets, and headsets. The computer system 200 can be incorporated as or in a particular device that in turn is in an integrated system that includes additional devices. In a particular embodiment, the computer system 200 can be implemented using electronic devices that provide voice, video or data communication. Further, while a single computer system 200 is illustrated, the term "system" shall also be taken throughout the present disclosure to include any collection of systems or sub-systems that individually or jointly execute a set, or multiple sets, of instructions to perform one or more computer functions.

As illustrated in FIG. 2, the computer system 200 includes a processor 204. The processor 204 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 204 is an article of manufacture and/or a machine component. The processor 204 is configured to execute software instructions in order to perform functions as described in the various embodiments herein. The processor 204 may be a general purpose processor or may be part of an application specific integrated circuit (ASIC). The processor 204 may also be a microprocessor, a microcomputer, a processor chip, a controller, a microcontroller, a digital signal processor (DSP), a state machine, or a programmable logic device. The processor 204 may also be a logical circuit, including a programmable gate array (PGA) such as a field programmable gate array (FPGA), or another type of circuit that includes discrete gate and/or transistor logic. The processor 204 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 200 includes at least one of a main memory 206 and a static memory 208. The main memory 206 and the static memory 208 can communicate with each other via a bus 210. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 200 may further include a video display device 212, such as a liquid crystal display (LCD), an organic light emitting diode (OLED), a flat panel display, a solid state display, or a cathode ray tube (CRT). The video display device 212 may be integrated with or physically separate from the components of the computer system 200 described herein.

Additionally, the computer system 200 may include an input device 214, such as a keyboard/virtual keyboard or touch-sensitive input screen or speech input with speech recognition. The computer system 200 may also include a cursor control device 216, such as a mouse or touch-sensitive input screen or pad, a microphone, etc. The computer system 200 may also include a signal generation device 218, such as a speaker or remote control, a game disk drive unit 220, and a network interface device 222.

In a particular embodiment, as depicted in FIG. 2, the game disk drive unit 220 may include a game computer-readable medium 224 in which one or more sets of instructions 226, e.g. software, can be embedded. Additionally or alternatively to the game disk drive unit 220, the computer system 200 may comprise any additional storage unit, such as, but not limited to, a solid state storage or other persistent storage, which comprises the computer-readable medium 224. Sets of instructions 226 can be read from the game computer-readable medium 224. Further, the instructions 226, when executed by a processor, can be used to perform one or more of the methods and processes as described herein. In a particular embodiment, the instructions 226 may reside completely, or at least partially, within the main memory 206, the static memory 208, and/or within the processor 204 during execution by the computer system 200.

Figure 3:
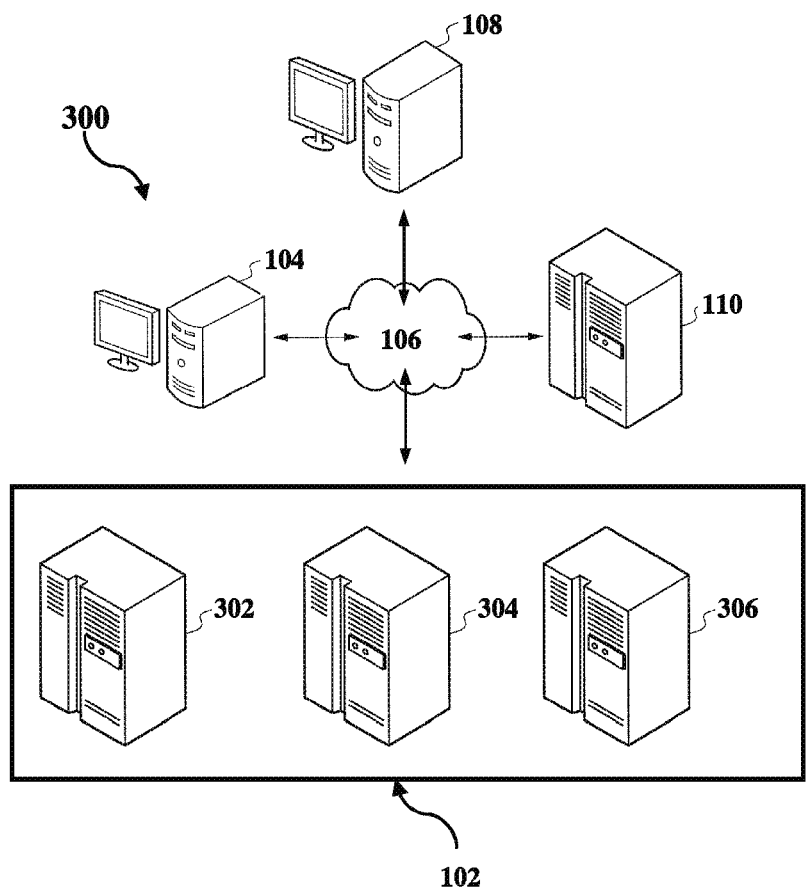
FIG. 3 shows a further exemplary system for controlling a network game in accordance with inputs of game spectators, according to an additional aspect of the present disclosure.

FIG. 3 shows a further embodiment of the network game system 100 of FIG. 1. The network game system of FIG. 3 is generally shown at 300. In the network game system 300 of FIG. 3, the game system 102 includes a game server 302, a rendering server 304, and a broadcaster 306. The game system 102 may additionally include the network interface 110, or any combination of the above-described entities. The game system 102 is generally described hereinafter as corresponding to the embodiment shown in FIG. 3. Nevertheless, it should be understood that the game system 102 may include additional or alternative embodiments in accordance with the embodiment shown in FIG. 2.

The network 106 may be, but is not limited to, a local area network, a wide area network, the Internet, a telephony network, or any other network commonly known and understood in the art. The network 106 is shown in FIG. 3 as being a wireless network. However, those skilled in the art appreciate that the network 106 may additionally or alternatively comprise a wired network.

The game system 102 is generally described herein as providing or hosting a network game. In this regard, the network game may be a multiplayer type network game or a single player type network game. The network game may be an action game, a shooter game, an adventure game, a role-playing game, a simulation game, a strategy game, or any other type of game generally known and understood in the art. While the game system 102 is generally described as providing the network game, additional or alternative services may also be provided without departing from the scope of the present disclosure. For example, the network game may be any other service which is provided via a network such as, but not limited to, a music program, an art program, an animation program, etc.

The game player 104 and the game spectator 108 are each shown in FIG. 3 in singular form. Nevertheless, it is to be known and understood that the network game system 300 may comprise a plurality of game players and a plurality of game spectators. In this regard, the game player 104 and the game spectator 108 are generally described hereinafter in plural forms, although those of ordinary skill in the art appreciate that the singular forms may generally be used interchangeably. Also, while the game players 104 and game spectators 108, or game player 104 and game spectator 108, are described as being "players" and "spectators," it should be appreciated that the game players 104 and game spectators 108 are not limited to being individuals but may refer to a game client, apparatus, or device, in singular and plural forms. The game players 104 and game spectators 108 may each be any entity or device which connects with the game server 102 or the display interface 110 via the network 106. For example, the game players 104 and game spectators 108 may each be the same or similar to the computer system 200 of FIG. 2, including similar elements and features or combinations thereof.

The game server 302, the rendering server 304, and the broadcaster 306 of the game system 102 may be disparate structures which are directly or indirectly connected via any of the networks described herein. In this regard, the structures may be physical, tangible structures. Any combination of these structures may be integral or non-integral with one another. They may also comprise non-tangible structures in further embodiments of the present disclosure. For example, the broadcaster 306 may be implemented via software and included within either of the game server 302, the rendering server 304, or a combination thereof.

The game server 302 executes and manages a game processing program for progressing the network game, instructs the rendering server 304 to perform an image rendering process, requests the game spectator input information, and exchanges game data with the game players 104. In other words, the game server 302 executes and manages game processing of the network in which the game players 104 participate and the game spectators 108 spectate. For example, the game server 302 manages game information such as a position and direction on a map of a character, or characters, operated by each of the game players 104, and an event, or events, to be provided for each character. The game information may include character information for each of the game players 104 or characters which reflects a current status of the game players 104 or characters. The game information may also include progress information which reflects a current status of the network game or service. The game server 302 also manages the request for the game spectator input information for controlling an aspect of the network game. The aspect of the network game which may be controlled includes, but is not limited to, any of the above-described game information such as the positions, directions, events, etc. Of course, these examples are merely exemplary and are not limiting or exhaustive. The game information and the request for the game spectator input information may comprise or relate to any information which is understood to be associated with a network game or other service.

The game server 302 exchanges the game information with the rendering server 304 and causes the rendering server 304 to generate a player game screen for each of the game players 104. For example, when controller information is received by the game server 302 from any of the game players 104 via the network 106 as a result of an operation input of the game players 104 or when the game spectator input information is received from the display interface 110 via the network 106, the game server 302 executes a process of reflecting these pieces of information on the character information of the characters of the game players 104 and on the environmental and other information of the network game. Then, the game server 302 determines at least one rendering object to be rendered on the player game screens based on the character information reflecting the controller information of operation inputs, and transmits a rendering instruction to the rendering server 304.

The rendering server 304 renders the player game screens in accordance with the rendering instruction received from the game server 302, and outputs the generated player game screens directly to the game players 104 or indirectly to the game players 104 via the game server 302. The rendering server 304 can simultaneously form the player game screens for all of the game players 104. Alternatively, the rendering server 304 can sequentially form the player game screens for all of the game players 104. Of course, the rendering server 304 may also perform any combination of simultaneously and sequentially forming the player game screens for the game players 104.

The rendering server 304 executes a game screen rendering process by a graphics processing unit based on information received from the game server 302 for each of the player game screens. The rendering server 304 may execute the game screen rendering process based on identification information of rendering objects contained in each of the player game screens, and detailed information indicating data necessary to render each rendering object. The detailed information necessary to render each rendering object may include, but is not limited to, information indicating the following attribute data: identification information for specifying model data; identification information for specifying texture data; specific information of a rendering program, for example, a shader, to be used; and specific information of data for calculations, for example, the light source intensity, light source vector, and rotation matrix, to be used in the rendering program. The detailed information including the above-listed information may be transmitted from the game server 302 to the rendering server 304, but information to be contained in the detailed information is not limited to the above information. For example, the detailed information may contain any of the above-listed information, and may additionally or alternatively contain any information to be used in the process of rendering a rendering object as generally understood in the art.

Each player game screen, which is rendered by the rendering server 304 in accordance with the transmitted rendering instruction including the rendering object identification information and detailed information, is transmitted to a corresponding one of the game players 104. The game players 104 may directly receive the player game screens from the rendering server 304, or the game players 104 may indirectly receive the player game screens from the rendering server 304 such as by way of the game server 302 or by any other entity. Thus, the game system 102 of FIG. 2 can generate the player game screens corresponding to operation input caused on a client device, and provide the player game screens to the game players 104 via the network 106. As a result, any graphic processing capabilities or requirements for participating in the network game may be minimized or eliminated altogether.

In addition to rendering the player game screens, the rendering server 304 also renders the spectator game screen. The game server 302 similarly exchanges game information with the rendering server 304 for causing the rendering server 304 to render the spectator game screen. The rendering server 304 generally renders the spectator game screen in a same or similar manner as the player game screens. Exemplary embodiments by which the rendering server 304 renders the spectator game screen are discussed in detail below.

The game system 102 of FIG. 3 is shown as including one game server 302 and one rendering server 304. Nevertheless, those of ordinary skill in the art will appreciate that the present disclosure is not limited to this arrangement. For example, it is also possible to allocate one rendering server 304 to a plurality of game servers 302, or to allocate a plurality of rendering servers 304 to a plurality of game servers 302. In further embodiments, the game system 102 may include separate rendering servers 304 for rendering the player game screens and for rendering the spectator game screen. Any rendering servers 304 may be specifically associated with any game server 302 or any of the player game screens and the spectator game screen. Additionally or alternatively, the game server 302 may designate a rendering server 304 or a graphics processing unit of a rendering server 304 to be used to execute a rendering instruction, in accordance with information indicating a number of game screens to be simultaneously or sequentially generated by a rendering server 304 or graphics processing unit of a rendering server 304.

The spectator game screen is transmitted to directly or indirectly to the broadcaster 306 from the rendering server 304. The spectator game screen may be transmitted to the broadcaster 306 in association with the request for the game spectator input information. In this regard, the request for the game spectator input information may be transmitted directly to the broadcaster 306 from the game server 302, or the request for the game spectator input information may be transmitted indirectly to the broadcaster 306 from the game server 302 such as via the game server. The broadcaster 306 receives and transmits the spectator game screen, and possibly the request for the game spectator input information, to the display interface 110. The broadcaster 306 may process, encode, compress, and/or output the information to the display interface 110 in accordance any known formats and/or teachings commonly understood in the art. In this regard, any output of the broadcaster 306 may only be limited by the graphic processing capabilities of the rendering server 304, as well as possibly being restricted by any downstream limitations of the display interface 110, game spectators 108, or network 106. Nevertheless, the output of the broadcaster 306 may be independent of any processing and display capabilities of the game players 104.

The display interface 110 receives the output of the broadcaster 306 and the request for the game spectator input information. The request for the game spectator input information may be included within an output stream of the broadcaster 306, transmitted separately by the broadcaster 306, or received directly from the game server 302. The display interface 110 is accessible by the game spectators 108 for viewing the spectator game screen in association with the request for the game spectator input information. The display interface 110 may comprise a server, platform, application, website, or any other interface which is configured to process, decode, and/or broadcast images or video streams via a public, private, or other medium. The display interface 110 may also be configured to receive inputs from the game spectators 108 in response to the request for the game spectator input information. The display interface 110 may transmit any inputs received from the game spectators 108 to the game server 302, or the display interface 110 may process the inputs and transmit the game spectator input information to the game server 302.

Exemplary embodiments of the components of the game system 102 of FIG. 3 are described below with respect to FIGS. 3-5.

Figure 4:
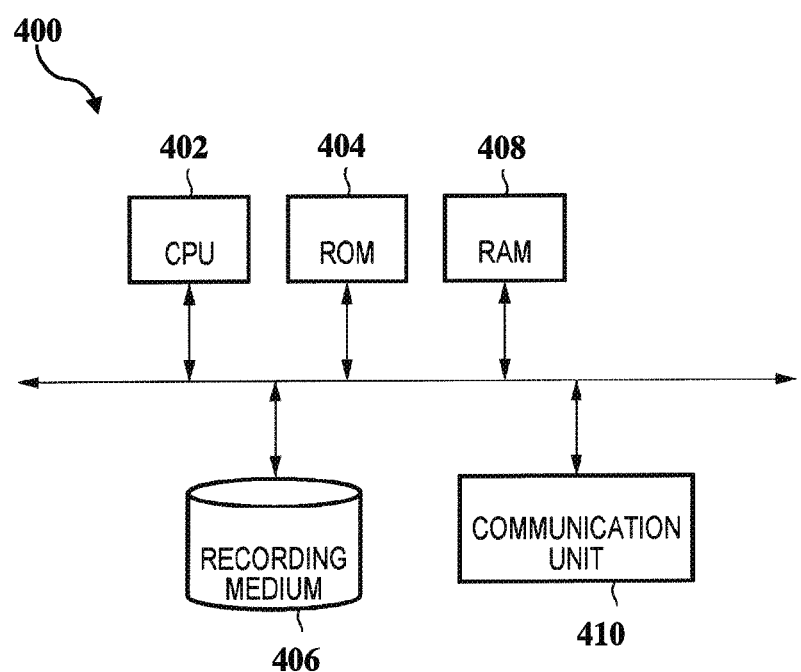
FIG. 4 shows a block diagram of an exemplary game server, according to an aspect of the present disclosure.

FIG. 4 is a block diagram showing an exemplary functional arrangement of the game server 302 according to an embodiment of the present disclosure. The game server 302 may be, for example, a game server system as generally shown at 400 in FIG. 4. However, it is to be appreciated that the game server 302 may also be the same or similar to the computer system 200 of FIG. 2. The game server 302 may comprise any combination of the components of the computer system 200 and the game server system 400.

A game CPU 402 controls the operation of each block of the game server system 400. More specifically, the game CPU 402 reads out a game processing program from, for example, a game ROM 404 or game recording medium 406, expands the program on a game RAM 408, and executes the program, thereby controlling the operation of each block. The game CPU 402 may be the same or similar to the processor 204 as described with respect to FIG. 2.

The game ROM 404 may be the same or similar to the main memory 206 of FIG. 2. For example, the game ROM 404 may be a programmable nonvolatile memory. The game ROM 404 stores the game processing program, and may also store other programs. The game ROM 404 also stores information such as a constant required for the operation of each block of the game server 400.

The game RAM 408 may be the same or similar to the static memory 208 of FIG. 2. For example, the game RAM 408 may be a volatile memory. The game RAM 408 is used not only as a game processing program expansion area, but also as a storage area for temporarily storing, for example, intermediate data output during the operation of each block of the game server 400.

The game recording medium 406 is, for example, a recording device such as an HDD detachable from the center server 400. The game recording medium 406 may be the same or similar to the disk drive unit 220 or the computer-readable medium 224 of FIG. 2. In this embodiment, the game recording medium 406 is used as, for example, a database for managing users and client devices using the network game, and a database for managing various kinds of information on the network game, which are required to generate the player game screens to be provided for each connected game player 104 and to generate the spectator game screen to be provided for the game spectators 108.

A game communication unit 410 is a communication interface of the game server system 400. The game communication unit 410 may be the same or similar to the network interface device 222 of FIG. 2. The game communication unit 410 exchanges data with the game players 104, the rendering server 304, the broadcaster 306, and the display interface 110. The game communication unit 410 may convert data into a data format complying with any necessary or required communication specifications.

Figure 5:
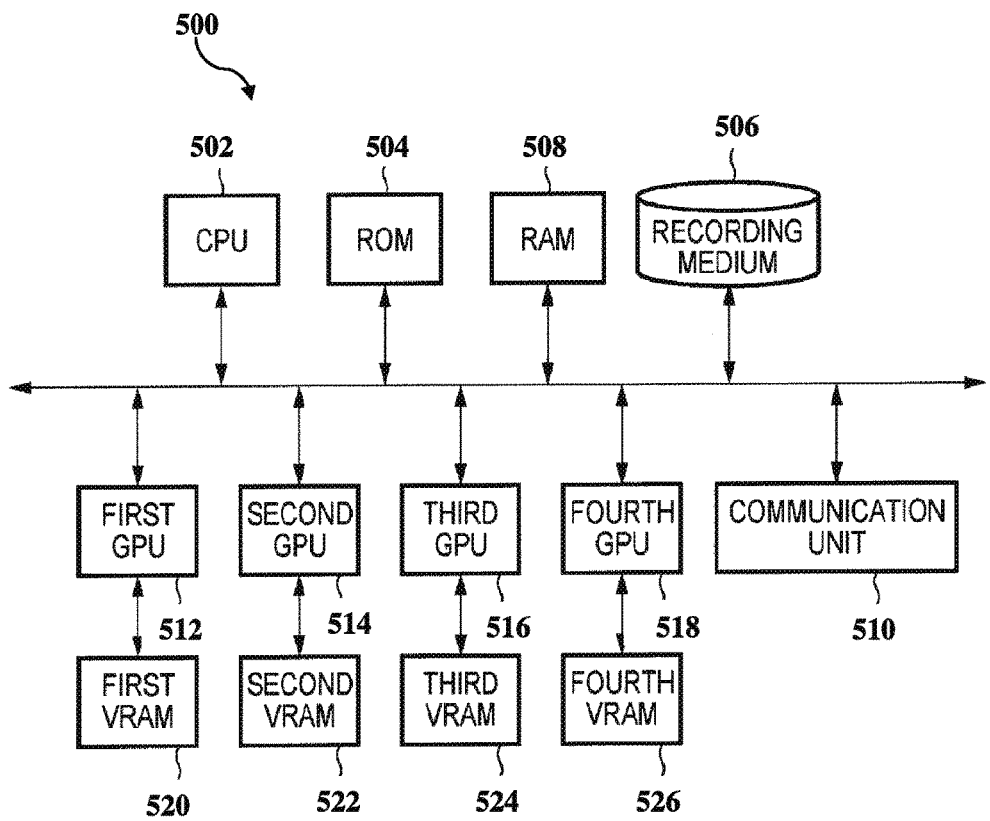
FIG. 5 shows a block diagram of an exemplary rendering server, according to an aspect of the present disclosure.

FIG. 5 is a block diagram showing an exemplary functional arrangement of the rendering server 304 according to an embodiment of the present disclosure. The rendering server 304 may be, for example, a rendering server system as generally shown at 500 in FIG. 5. However, it is to be appreciated that the rendering server 304 may also be the same or similar to the computer system 200 of FIG. 2. The rendering server 304 may comprise any combination of the components of the computer system 200 and the rendering server system 500.

A rendering CPU 502 controls the operation of each block of the rendering server system 500. More specifically, the rendering CPU 502 reads out a rendering process operation program stored in a rendering ROM 504 or rendering recording medium 506, expands the program on a rendering RAM 508, and executes the program, thereby controlling the operation of each block. The rendering CPU 502 may be the same or similar to the processor 204 as described with respect to FIG. 2.

The rendering ROM 504 may be the same or similar to the main memory 206 of FIG. 2. For example, the rendering ROM 504 may be a programmable nonvolatile memory. The rendering ROM 504 stores the rendering process operation program, other operation programs, and information such as a constant required for the operation of each block of the rendering server system 500.

The rendering RAM 508 may be the same or similar to the static memory 208 of FIG. 2. For example, the rendering RAM 508 may be a volatile memory. The rendering RAM 508 is used not only as an operation program expansion area, but also as a storage area for temporarily storing, for example, intermediate data output during the operation of each block of the rendering server system 500.

The rendering recording medium 506 is, for example, a recording device such as an HDD detachable from the rendering server system 500. The rendering recording medium 506 may be the same or similar to the disk drive unit 220 or the computer-readable medium 224 of FIG. 2. In this embodiment, the rendering recording medium 506 may store the following data to be used to generate the game player screens and the spectator player screens the rendering process: model data; texture data; a rendering program; and data for calculations to be used in the rendering program. Of course, the above-listed data is merely exemplary and not limiting or exhaustive. In additional embodiments, the rendering recording medium 506 may store additional or alternative data without departing from the scope of the present disclosure.

A rendering communication unit 510 is a communication interface of the rendering server system 500. The rendering communication unit 510 may be the same or similar to the network interface device 222 of FIG. 2. The rendering communication unit 510 exchanges data with another apparatus, for example, the game players 104, the rendering server 304, and the broadcaster 306. When transmitting data, the rendering communication unit 510 may convert the data into a data transmission format determined with respect to a transmission network or a transmission destination apparatus, and transmits the data to the transmission destination apparatus. When receiving data, the rendering communication unit 510 may convert received data into an arbitrary data format readable by the rendering server system 500, and store the data in, for example, the rendering RAM 508.

First, second, third, and fourth rendering GPUs 512, 514, 516, and 518 each generate one of the player game screens to be provided for the game players 104 or the spectator game screen to be provided for the game spectators 108. Each rendering GPU 512, 514, 516, and 518 is connected to a video memory, such as first, second, third, and fourth rendering video RAMs (VRAMs) 520, 522, 524, and 526, as a game screen rendering area. Each rendering GPU 512, 514, 516, and 518 may also include a cache memory (not shown). When performing rendering on the connected rendering VRAM 520, 522, 524, and 526, each rendering GPU 512, 514, 516, and 518 expands a rendering object on the cache memory, and writes the mapped rendering object in the corresponding rendering VRAM 520, 522, 524, and 526. FIG. 5 shows one video memory being connected to each graphics processor. However, it is to be known and understood that the number of video memories connected to the graphics processors can be any arbitrary number. Moreover, FIG. 5 shows the rendering server system 500 as including four graphics processors. However, it is also to be known and understood that the graphics processors can be any arbitrary number.

Each of the broadcaster 306 and the display interface 110 may comprise any combination of the components of the computer system 200, the game server system 400, and the rendering server system 500.

An exemplary embodiment of basic network game processing executed on the network game system 300 having the arrangement of the game server 302 and the rendering server 304 as described above is generally explained with reference to FIG. 6. The basic network game processing is generally shown at 600 and may be implemented by the game server 302 reading a corresponding processing program and executing the processing program, as described above with respect to FIG. 4.

The network game processing 600 may be started when, for example, the network game begins or the game server 302 is activated, and repetitively executed for each frame of the network game. In the network game processing 600, the game server 302 and the rendering server 304 are described as providing the player game screens for the game players 104. However, as will be evident from the disclosure below, similar processing may also be executed each frame for providing the spectator game screen to the broadcaster 306.

In step S602, the game server 302 determines whether information indicating an operation input caused on any of the game players 104 is received and/or whether an operation input caused on any of the game spectators 108 is received. If the game server 302 determines that the information indicating either of the operation inputs is received, the game server 302 advances the process to step S604. If not, the game server 302 advances the process to step S606.

In step S602, the game server 302 updates game information based on the information indicating the operation input on the game players 104, which is received in step S602. For example, the game server 302 determines state information corresponding to a character in the network game, which is an operation target of a user of a corresponding game player 104. The character state information is information of the action and appearance of the character that may be changed by the user's operation, for example, the position (e.g., coordinate information) of the character on the map, the gazing direction of the character, and a character's action. The game server 302 refers to the received operation input information, and updates a parameter that changes by the operation input, among parameters contained in the state information, by the received operation input information. Accordingly, the game server 302 can reflect, in the network game, the information of the operation input performed by any of the game players 104.

In step S606, the game server 302 updates state information of a rendering object as a state management target in the network game, except for the character as an operation target of each of the game players 104. Examples of the rendering object as a state management target in the network game may be a non-player character that is not a target of a user's operation, and a background object such as a landform. A rendering object as a state management target in the network game changes with time or by the action of a character as a user's operation target. In step S606, therefore, the game server 302 updates the state information of a rendering object as a state management target in the network game, in accordance with the elapse of time or the character state information updated in step S604.

In step S608, the game server 302 specifies rendering objects contained in the player game screen provided for each of the game players 104. The rendering objects contained in the player game screens may include a character's rendering object as a user's operation target as identified in S604, and a rendering object as a state management target in the network game as identified in S606. In other words, the game server 302 selects each game player 104 presently connected to the game server 302, and reads information of a player game screen rendering range with which each of the game players 104 is associated. The information of the game screen rendering range may include, for example, camera parameters corresponding to the player game screens.

In step S610, the game server 302 transmits, to the rendering server 304, instructions to render the player game screens to be provided for the game players 104, and causes the rendering server 304 to execute rendering processing. The game server 302 may transmit the instructions for all of the game players 104, or for less than all of the game players 104. The instructions may be simultaneously, sequentially, or serially transmitted. The instructions may include, for each game player 104, identification information for the game player 104, the rendering objects contained in the player game screen, detailed information set for each of the rendering objects contained in the player game screen, state information of each rendering object contained in the player game screen, and information of the rendering range and display setting of the player game screen.

Figure 6:
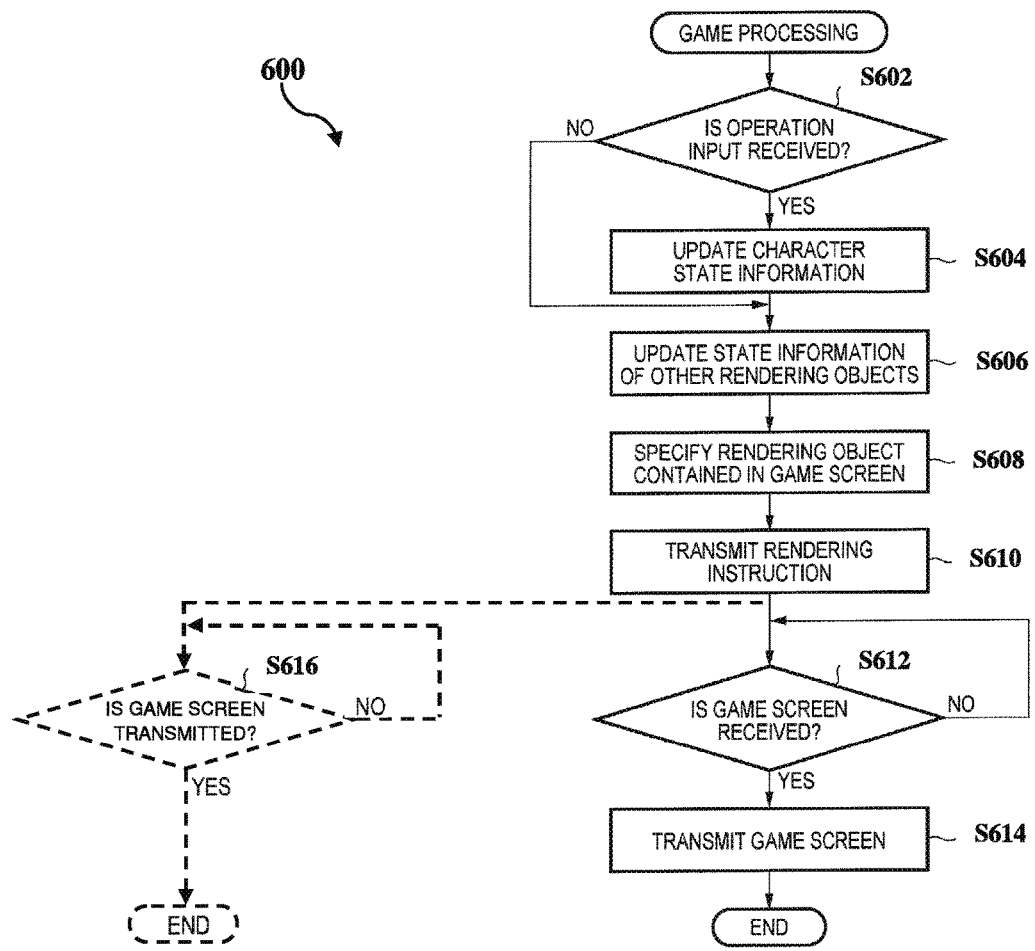
FIG. 6 shows a flowchart of an exemplary network game process, according to an aspect of the present disclosure.

In an embodiment of the network game processing 600 as shown in FIG. 6, at step S612, the game server 302 may determine whether the player game screens generated by the rendering server 304 in accordance with the rendering instruction are received from the rendering server 304. If it is determined that the player game screens are received, the game server 302 advances the process to step S614 and transmits the player game screens to the game players 104. If the player game screens are not received at step S612, the game server 302 waits until the player game screens are received. The game server 302 may wait until all of the player game screens are received, such that the player game screens of the game players 104 are transmitted at a same time. Alternatively, the game sever 202 may transmit each player game screen as it is received.

In an alternative embodiment of the network game processing 600 as shown in FIG. 6, the rendering server 304 may transmit the player game screens to the game players 104. In this regard, the game server 302 may determine whether the player game screens have been transmitted at step S616. For example, the game server 302 may determine whether the player game screens have been transmitted by receiving a confirmation from the rendering server 304. In even further embodiments of the present disclosure in which the rendering server 304 transmits the player game screens to the game players 104, the game server 302 does not receive any confirmation and the network game processing 600 may end after step S610. In accordance with the above embodiments, the rendering server 304 may also transmit the player game screens to the game players 104 at a same time or as the player game screens are rendered.

The network game processing 600 of FIG. 6 is merely an exemplary method of a configuration of the game server 302 and the rendering server 304. Additional and alternative embodiments of the network game processing 600 may be provided without departing from the scope of the present disclosure. The shown embodiment is merely exemplary and should not be considered limiting.

Figure 7:
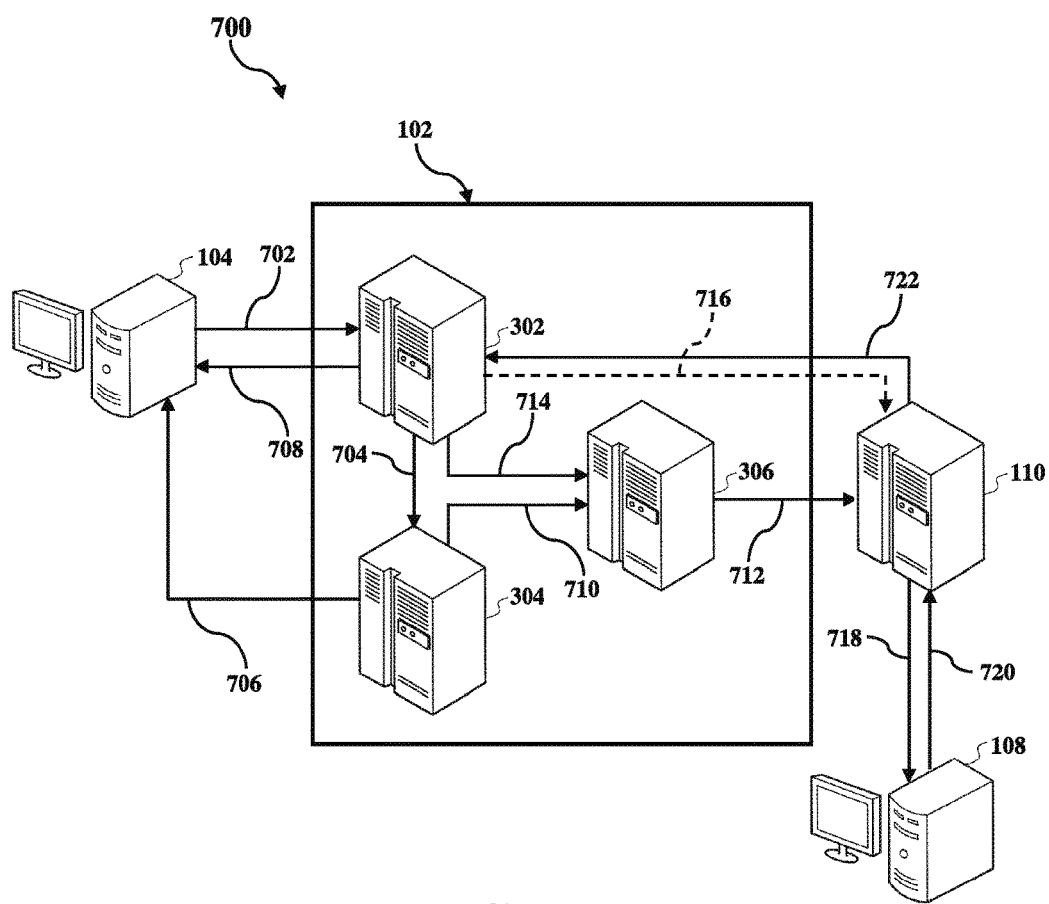
FIG. 7 shows a schematic of an exemplary system for controlling a network game in accordance with inputs of game spectators, according to an aspect of the present disclosure.

FIG. 7 shows a schematic of the network game system 300 of FIG. 3 at 700. The game server 302 executes a game program and generates game information for progressing the network game. The game players 104 are connected to the game server 302 for participating in the network game. The game server 302 receives controller input information 702 from the game players 104, updates the game information based on the controller input information 702, and issues a rendering instruction 704 to the rendering server 304 as generally discussed above.

The rendering instruction 704 may comprise an instruction to render a single player game screen for one of the game players 104, or the rendering instruction 704 may comprise an instruction to render the player game screens for multiple ones of the game players 104. In this regard, the rendering server 304 may render a different player game screen for each of the game players 104. Alternatively, the rendering server 304 may render a same player game screen for multiple ones of the game players 104. For example, when the network game includes a group of characters which cooperate as a party, the rendering server 304 may render a same player game screen for the game players 104 which control the characters of the party. In any event, the rendering server 304 is configured to render a plurality of player game screens for the game players 104 based on the rendering instruction 704 received from the game server 302.

The rendering server 304 receives the rendering instruction 704, including the necessary game information, from the game server 302 and generates the player game screens for the game players 104. The player game screens are transmitted to the game players 104 as video information 706 for display by the game players 104. In the embodiment of the present disclosure shown in FIG. 7, the rendering server 304 provides the video information 706 directly to the game players 104. The rendering server 304 may transmit the video information 706 to the game players 104 via the network 106 (not shown). The video information 706 may be transmitted to each of the game players 104 as a unicast transmission or communication. The game server 302 may separately provide audio information 708 to the game players 104. The game server 302 may also transmit the audio information 708 to the game players 104 via the network 106 (not shown). The audio information 708 may also be transmitted to each of the game players 104 as a unicast transmission or communication. Of course, those of ordinary skill in the art appreciate that, in alternative embodiments of the present disclosure as generally discussed with respect to FIG. 6, the rendering server 304 may provide the video information 706 to the game server 302, whereupon the game server 302 provides the video information 706 and the audio information 708 to the game players 104.

The rendering instruction 704 provided by the game server 302 to the rendering server 304 may further include an instruction for generating or rendering a spectator game screen. The spectator game screen is generated or rendered such that the game spectators 108 may watch or view the network game without participating therein. While the game players 104 each participate in the network game and may control a player character of the network game, the game spectators 108 do not participate in the network game and may not control any player character of the network game. In this regard, the game spectators 108 are not connected to the game server 302 or the game system 102, and they do not receive any game information directly from the game server 302, the rendering server 304, or the game system 102.

While the game players 104 each include or execute a game client for participating in the network game, the game spectators 108 do not include or execute the game client. The game client may be any piece of software which connects to the game system 102 for participating in the network game. The game client may facilitate or comprise an interface for exchanging information between the game players 104 and the game system 102, including the game server 302 and the rendering server 304. The game client may, for example, facilitate the exchange of the controller input information 702, the video information 706, the audio information 708, and/or any additional game data. The game client may be stored or installed by the game players 104. For example, the game client may be included within any combination of the main memory 206, static memory 208, drive unit 220, and computer readable medium 226 as described with respect to FIG. 2. The game client may additionally or alternatively be accessed remotely by the game players 104. For example, the game client may be accessed by the game players 104 via the network 106 (not shown) and stored in a cloud computing system or managed by the game system 102. In these embodiments, the games players 104 may access a website for executing the game client. Of course, the above description is merely exemplary and the game client may comprise any additional or alternative embodiments or features as understood in the art. In any event, information of the network game is accessible to the game players 104 via the game client, whereas information of the network game, including the spectator game screen, may only be accessible to the game spectators via the display interface 110 or alternative distribution mechanisms as the game spectators 108 do not include or execute the game client. As a result, the game spectators 108 need not obtain, own, or access the game client for viewing the network game.

The spectator game screen may be managed by the game server 302 and controlled via the rendering instruction 704. In an embodiment of the present disclosure, the game server 302 may manage the spectator game screen by executing a game process as generally shown at 800 in FIG. 8. That is, a spectator game screen management process may be initialized at step S802. The process may be initialized when the network game is initiated, when game play is started, or when the game server 302 is activated. After initialization, the game server 302 may determine whether a spectator mode of the network game is enabled at step S804. If the spectator mode is enabled, the game server 302 may create a dummy player or fake client which is not controlled by any of the game players 104 at step S806. The game server 302 may create and manage the dummy player in a database in a same or similar manner as the game players 104. After creation of the dummy character at step S806, game processing of the network game is resumed at step S808 in accordance with normal game processing, for example, as described with respect to FIG. 6.

Figure 8:
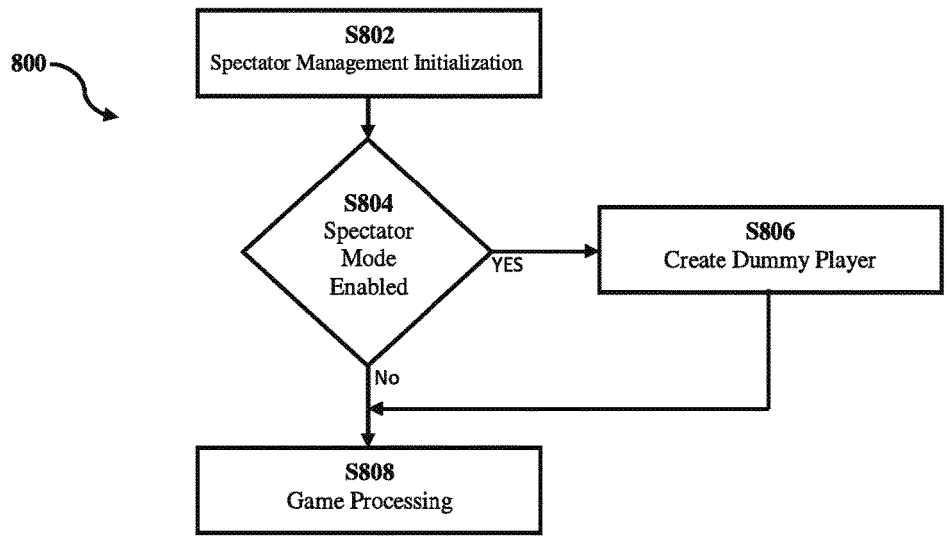
FIG. 8 shows a flowchart of an exemplary game process for creating a dummy player for generating a spectator game scream, according to an aspect of the present disclosure.

According to the spectator game screen management process 800 of FIG. 8, the game server 302 manages the spectator game screen as corresponding to the dummy player. As a result, the game server 302 may transmit a similar, or same, rendering instruction 704 to the rendering server 304 for generating the spectator game screen in correspondence with the dummy player as if transmitting the rendering instruction 704 to the rendering server 304 for generating the player game screens of the game players 104. In other words, the rendering instruction 704 for generating the spectator game screen need not be distinguishable, different, or separate from the rendering instruction 704 for generating the player game screens. Thus, any physical structure or functionality of the rendering server 304 need not be altered or modified for generating the spectator game screen.

The game server 302 may create the dummy player at step S806 in correspondence with a fixed reference point in the network game. That is, the game server 302 may create the dummy player as having a fixed position (e.g., coordinate information) on a game map or in a game space or game environment. The game server 302 may additionally or alternatively create the game character as having a fixed gazing direction or viewing angle. According to such embodiments, the game server 302 would not need to perform any processing at S602 and S604 of FIG. 6. That is, the game server 302 not determine whether any controller input information 702 is received from the dummy player, as the dummy player is not controlled by any of the game players 104 at step S806. The game server 302 would also not need to update any character state information for the dummy player, as the position and gazing direction of the dummy player are fixed. The game server 302 may include a default setting for the dummy player whereby the game server 302 does not executing any processing pursuant to step S602 and/or S604 of the game processing 600 of FIG. 6.

In further embodiments of the present disclosure, the game server 302 may create the dummy player as having a fixed position (e.g., coordinate information) on the game map or in the game space or game environment, while having a variable gazing direction or viewing angle. The variable viewing angle or direction may be configured in accordance with a predetermined pattern or based on predetermined rules. For example, the predetermined pattern may be set to continuously pan the game space or game environment from a left-to-right direction, or vice-versa, in a sweeping manner. The predetermined rules may be set, for example, such that the viewing angle or direction follows a closest character or a winning character. The predetermined rules may additionally or alternatively be set based on a priority of events in the network game. For example, viewing a battle may take precedence over viewing a conversation. Of course, the above examples are merely exemplary and are not limiting or exhaustive. In such embodiments in which the gazing direction or viewing angle of the dummy character is variable, the game server 302 may perform processing pursuant to step S604 of the game processing 600 of FIG. 6 to update the character state information of the dummy character.

In even further embodiments of the present disclosure, the game server 302 may create the dummy player as having a variable position (e.g., coordinate information) on the game map or in the game space or game environment, while having either a fixed or variable gazing direction or viewing angle. The variable position of the dummy character may be configured to move throughout the game space or the game environment in accordance with a predetermined pattern or in association with predetermined events or conditions. The predetermined pattern may be repetitive or arbitrary to enhance variety and spectator interest. The predetermined events or conditions may include being offset a predetermined distance from a position of any of the game players 104, such as a winning player. The predetermined events or conditions may also include events in the network game, such as battles or conversations. In this regard, the dummy character may be configured to follow the events based on a priority of events. For example, the dummy character may be configured to follow battle events in priority to conversations. Once again, those of ordinary skill in the art will appreciate that the above examples are exemplary and are not limiting or exhaustive. In such embodiments in which the position of the dummy character is variable, the game program may cause the game server 302 to receive the movements of the dummy character as the controller input information 702 pursuant to step S602 of the game processing 600 of FIG. 6. As a result, the game server 302 may update the character state information of the dummy character at step S604 in similarity with updates to the character state information of the game players 104.

In additional embodiments of the present disclosure, the game server 302 may create the dummy player at step S806 in correspondence with an animate or inanimate object of the network game. For example, the game server 302 may create the dummy player in correspondence with a sun, moon, star, or bell tower. According to such an embodiment, the spectator game screen, as viewed by the dummy player, may be provided as an overhead view of the game space or game environment without requiring additional computations for determining a position of the dummy player. The game server 302 may further create the dummy player in correspondence with an object in the network game, such as an enemy character or animal. By this means, the spectator game screen may be moved within the game space or game environment while minimizing computations and maintaining a natural look and feel of the network game. An interest of the game spectators 108 will also be enhanced by providing a feeling of participation within the network game. Once again, the above examples are merely exemplary and are not limiting or exhaustive. In accordance with these embodiments, the game program may cause the game server 302 to receive information of the animate or inanimate objects as the controller input information 702 pursuant to step S602 of the game processing 600 of FIG. 6. Alternatively, the game server 302 may replicate or copy the state information of the animate or inanimate objects from processing performed pursuant to step S606 of the game processing 600 of FIG. 6.

In the above-described exemplary and non-limiting embodiments, the spectator game screen is generally managed by the game server 302 so as to be different than each player game screen of the game players 104. The spectator game screen may comprise a global view of the network game, and thus, the game spectators 108 need not specifically follow or have loyalty to any particular one of the game players 104. Thus, diversity and breadth of the game spectators 108 may be increased.

The spectator game screen may also be the same or include at least one of the player game screens of the game players 104. According to such embodiments, the game server 302 may configure the dummy player to be the same as or similar to one of the game players 104. In this regard, the game program may cause the game server 302 to receive the controller input information 702 of the one of the game players 104 as the controller input information 702 of the dummy character at S602 of the game processing 600 of FIG. 6. For example, the game program may store identification information of one of the game players 104 as identification information of the dummy player. When the controller input information 702 is received which includes the identification information, the controller input information 702 may be associated with the one of the game players 104 and also with the dummy player, with the character state information of each player being updated in step S604. As a result, redundant rendering instructions 704 may be transmitted for generating each of the player game screen of the one of the game players 104 and the spectator game screen of the game spectators 108 at S610. Accordingly, the structure or functionality of the rendering server 304 need not be modified for accommodating the spectator game screen. Alternatively, a same rendering instruction 704 may be transmitted for both of the player game screen of the one of the game players 104 and the spectator game screen of the game spectators 108 at S610. The rendering server 304 may generate a single game screen as both the player game screen of the one of the game players 104 and the spectator game screen of the game spectators 108. According to such an embodiment, a processing load on the game server 302 may be reduced via duplication.

In the embodiments of the present disclosure in which the dummy player is configured to be the same or similar to one of the game players 104, the dummy player may be fixed to the one of the game players 104 for a duration of the network game. The dummy player may be fixed to the one of the game players 104 based on a ranking of the one of the game players 104, a status or role of the one of the game players 104 in the network game, or based on any other criteria which is known and understood in the art. However, the dummy player need not be configured to be the same or similar to one of the game players 104 for an entire duration of the network game. That is, a configuration of the dummy player may switch between different game players 104, or between any of the configurations of the dummy player described herein. For example, the rendering server 304 may generate the spectator game screen as corresponding to the player game screen of one of the game players 104 for a number of frames followed by corresponding to the player game screen of another of the game players 104 for a number of frames. Accordingly, the rendering server 304 may generate a stream of spectator game screens, with the stream including player game screens of a plurality of the game players 104. The player game screens of the different game players 104 may be consecutively, sequentially, serially, or otherwise displayed in the stream. According to such embodiments, the game spectators 108 may watch or view multiple ones of the game players 104, thereby creating further appeal and interest amongst the game spectators 108.

Figure 9:
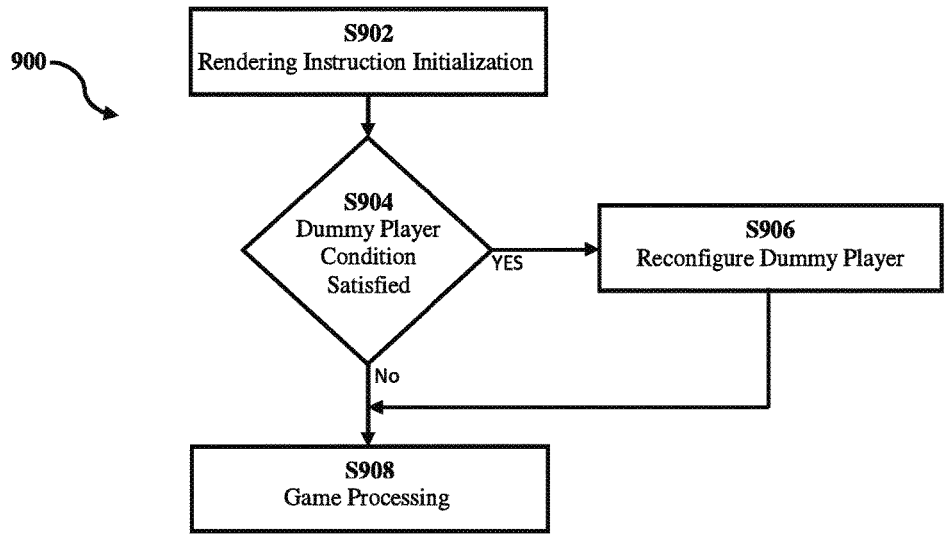
FIG. 9 shows a flowchart of an exemplary game process for reconfiguring a dummy player for switching a spectator game scream, according to an aspect of the present disclosure.

The game server 302 may execute game processing as generally shown at 900 in FIG. 9 to switch the spectator game screen from amongst the player game screens of the game players 104. The game server 302 undergoes a rendering instruction initialization processing at step S902. The rendering instruction initialization processing may begin in accordance with each frame, a clock-cycle, as a result of the controller input information 702 being received by the game server 302 from any one or all of the game players 104, or based on any additional or alternative criteria. For example, in an embodiment of the disclosure in which the spectator game screen switches from corresponding to a first one of the game players 104 to a second one of the game players 104, the game server 302 may execute the game processing 900 of FIG. 9 when the controller input information 702 is received from either or both of the first and second ones of the game players 104.

After initialization, the game server 302 determines whether a dummy player condition is satisfied at step S904. The dummy player condition may be related to either or both of the first and second ones of the game players 104, or related to a state or event of the network game. For example, the dummy player condition may include either of the first and second ones of the game players 104 engaging in a predetermined event during the network game, such as a battle or conversation. The dummy player condition may also include a status of a player character of either of the first and second ones of the game players 104 being in a predetermined state, such as incurring damage or being below a threshold. Of course, these examples are merely exemplary and are not limiting or exhaustive.

If the dummy player condition is satisfied, the game server 302 may reconfigure or modify the settings of the dummy player or fake client which is not controlled by any of the game players 104 at step S906. For example, the game server 302 may reconfigure the dummy player in the database to correspond to the second one of the game players 104 instead of the first one of the games players. Thereafter, game processing of the network game is resumed at step S908 in accordance with normal game processing, for example, as described with respect to FIG. 6.

While the game processing 900 of FIG. 9 has been described with respect to switching the spectator game screen from amongst the player game screens of the game players 104, it should be understood that the spectator game screen may be switched amongst any of the embodiments of the dummy player as described herein. Moreover, while the spectator game screen has been described as being switched between two different screens, it should also be understood that the spectator game screen may be switched amongst any number of screens.

The rendering server 304 transmits the generated spectator game screen to the broadcaster 306 as rendering server broadcast information 710. The broadcaster 306 receives the rendering server broadcast information 710, processes, encodes, and/or compresses the information, and transmits the resultant data to the display interface 110 as broadcaster information 712. The broadcaster information 712 may include only the rendering server broadcast information 710 received from the rendering server 304. Alternatively, the broadcaster 306 may also receive game server broadcast information 714 transmitted to the broadcaster 306 from the game server 302. The game server broadcast information 714 may include, for example, audio information of the network game. In this regard, the broadcaster 306 may receive video information from the rendering server 304 as the rendering server broadcast information 710, and receive audio information from the game server 302 as the game server broadcast information 714. The broadcaster 306 may merge the video information and the audio information in accordance with any known and understood methods or protocols. For example, the broadcaster 306 may merge the video information and the audio information in accordance with real time messaging protocol (RTMP), and transmit the resultant audio and visual stream to the display interface 110 as the broadcaster information 712.

Accordingly, the display interface 110 receives the spectator game screen, or a stream thereof, as the broadcaster information 712 from the broadcaster 306. The display interface 110 may also receive a request for game spectator input information to be displayed in connection with the spectator game screen, or stream thereof. The request for the game spectator input information is a request by the game system 102 for input from the game spectators 108, whereupon the game system 102 controls an aspect of the network game in accordance with the input from the game spectators 108.

The request for the game spectator input information may be generated by the game server 302 and transmitted directly or indirectly to the display interface 110. For example, the request for the game spectator input information may be transmitted from the game server 302 to the rendering server 304 in accordance with the rendering instruction 704. In this regard, the request may comprise a graphic or menu that is generated by the rendering server 304 in, or in association with, the spectator game screen. The request may be transmitted from the rendering server 304 to the broadcast server 306 in accordance with the rendering server broadcast information 710, and output by the broadcast server 306 to the display interface 310 as the broadcaster information 712. Additionally, or alternatively, the request for the game spectator input information may be transmitted from the game server 302 to the broadcast server 306 in accordance with the game server broadcast information 714. The broadcaster 306 may receive the request as a content source of the broadcaster information 712, or broadcast stream therein, which is described hereinafter. The broadcaster 306 may combine or compile the request which is received from the game server 302 and the rendering server broadcast information 710 which is received from the rendering server 304, and output the resultant data or stream to the display interface 110 in accordance with the broadcaster information 712. In even further additional or alternative embodiments, the request for the game spectator input information may be transmitted directly from the game server 302 to the display interface 110 as a game spectator information request 716. In any event, the display interface 110 receives the request for the game spectator input information for display in association with the spectator game screen, such that the game spectators 108 may control an aspect of the network game while viewing a broadcast stream of the network game.

The aspect of the network game which is controlled through via the request and by the game spectator input information may comprise any character, element, or feature of the network game. For example, the aspect may include an enemy character. The game server 302 may request specification of a type of an enemy character which is to appear in the network game. The request may also be for control of an action of an existing character, such as a target of an enemy character or an attack action to be carried out by the enemy character. The aspect may additionally or alternatively include an item or element in the network game. For example, the item may be a flag in a capture-the-flag-style game, wherein the request is for specification of a location of the flag. The item may also be a relic or weapon in the network game, wherein the request is for specification of a benefit or power of the relic or weapon. The aspect may even further be a feature of the network game such as a weather or terrain type. The request may be a yes-or-no request to determine whether a brewing storm culminates in the network game, a multiple-choice request to determine a field or weather condition in which a sporting event is to be performed, a matching request to align climates with areas in a first-person-shooter game, or an open-ended request to determine a name of a character. The above-examples are merely exemplary and are not limiting or exhaustive. The aspect of the network game which is controlled in accordance with the request may be any combination of the above-described examples, and also any additional or alternative aspects, without departing from the scope of the network game.

For example, in a further embodiment, the aspect of the network game may comprise the dummy player. The request may be for control of a viewing angle or position of the dummy player in the game space or environment. As a result, the game spectators 108 may collectively or individually control the spectator game screen. The request may further be for control of an action of the dummy player in the network game. By this means, the game spectators 108 may collectively or individually control the dummy player in the network game to provide a sense of participation. In these embodiments, the game system 102 may update or reconfigure the dummy player in accordance with step S906 of FIG. 9 when a reply to the request is received from the game spectators 108.

In summary, the aspect of the network game which is controlled in accordance with the game spectator input information may comprise any character, item, or feature of the network game which presently exists in the network or which may come into existence in the network game. In other words, the aspect of the network game may even relate to a non-existent character, item, or feature of the network game. The aspect of the network game may further include features which previously existed in the network game, such as, for example, when the game system 102 requests that the game spectators determine a character, either a player character or a non-player character, for resurrection. In such embodiments, the game spectators 108 may give new life to the game players 104 or non-player characters. This would entice the game players 104 to win over the game spectators 108 and be a fan favorite. It would also allow the game spectators 108 to bring back their favorite characters, thereby promoting interest in viewing or spectating the network game.

The game server 302 may generate and transmit the request for the game spectator input information before game play begins, during game, or even after game play ends. For example, after initialization of the network game but before the game play, storyline, or competition begins, the game server 302 may generate the request to solicit a game environment, game objective, or even game teams or parties of the network game. In accordance with such features, variety and unpredictability of the network game are increased while providing the game spectators 108 with a sense of responsibility or interest in the outcome. The game spectators 108 may even gain notoriety for being a spectator, such as by being a captain which selects the winning team. In this regard, the broadcast interface 110 or game system 102, or game server 302, may maintain a record or history of the selections of game spectators 108, including scores, rankings, records, or other features.

The game server 302 may also generate and transmit the request for the game spectator input information during the game play, in accordance with any of the embodiments described herein. The game system 102, or game server 302, may even further generate the request after game play, or a match thereof, has ended, such as when a request to select a character for resurrection is transmitted. The request after termination of game play or a match may also be to decide which players or characters will participate in a next game or match or which characters will not participate in a next game or match. For example, the request may determine the next challengers for any winning game players 104 of the terminated game or match. The next challengers may be determined from amongst losing game players 104 or any newly registered or logged-in game players 104. The request may also be to eliminate players or characters from participation in the next game or match. In such embodiments, the game spectators 108 may arrange desirable games or matches to promote viewer interest and may also regulate a competitive balance.

Figure 10:
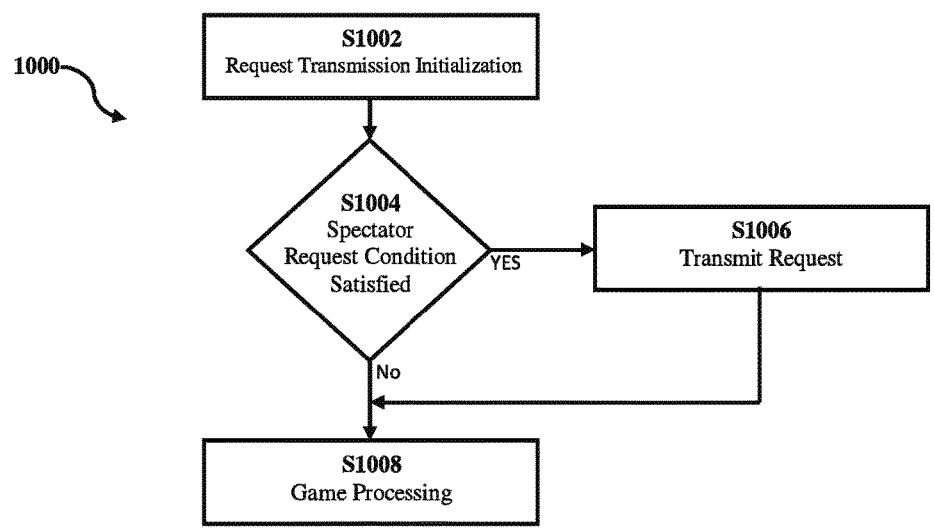
FIG. 10 shows a flowchart of an exemplary game process for generating and transmitting a request for game spectator input information, according to an aspect of the present disclosure

The game server 302 may execute game processing as generally shown at 1000 in FIG. 10 for transmitting the request for the game spectator input information. The game server 302 undergoes spectator request transmission initialization processing at step S1002. The spectator request transmission initialization processing step S1002 may begin in accordance with each frame, a clock-cycle, as a result of the controller input information 702 being received by the game server 302 from any one or all of the game players 104, or based on any additional or alternative criteria. For example, in an embodiment of the disclosure in which the spectator game screen reconfigures the dummy player, the game server 302 may execute the spectator request transmission initialization processing step S1002 when the dummy player is reconfigured at step S906 of FIG. 9. In this regard, the request for the game spectator input information may be generated in correspondence with a view to which the spectator game screen is switched, with a content of the request also corresponding to the view to which the spectator game screen is switched. In other words, the aspect of the network game which is being controlled via the request may be displayed in or correspond to the spectator game screen. As a result, interest in viewing the network game by the game spectators 108 is preserved when the spectator game screen is switched by also switching an aspect of an active request for game spectator input information to correspond to the current spectator game screen. The spectator request transmission initialization processing step S1002 may additionally or alternatively be performed in accordance with any of the additional features of the present disclosure, such as, but not limited to, when the rendering instruction 704 is transmitted from the game server 302 to the rendering server 304.

After initialization, the game server 302 determines whether a condition for transmitting the request for the game spectator input information is satisfied at step S1004. The condition may be related to any status or state of the network game as generally understood in the art. For example, the condition may be related to an event which is occurring or will be occurring in the network game. In other words, the condition may be related to a storyline of the network game. The condition may be preprogrammed or predetermined. For example, the condition be satisfied in association with a predetermined event of the network game. The condition may also include a random or variable element. For example, the condition may be dependent on the spectator game screen. That is, the decision as to whether to request the game spectator input information may depend on whether the aspect which is to be controlled is displayed by the spectator game screen. The game server 302 may decide to request the game spectator input information to determine the effect of a relic which is discovered by a character which is displayed in the spectator game screen, but determine not to request the game spectator input information to determine the effect of a relic which is discovered by a character which is not visible in the spectator game screen In an additional example, the game server 302 may request control over an aspect of a battle which is occurring in the spectator game screen, but not request control over an aspect of a battle which is not occurring in the spectator game screen. According to these embodiments, spectator control may be limited to aspects which are viewed and of interest to the game spectators 108. Of course, these examples are merely exemplary and are not limiting or exhaustive. The game server 302 may determine whether to request control over any aspect of the network game in accordance with any additional conditions which are known and understood in the art without departing from the scope of the present disclosure.

If the spectator request condition is satisfied at step S1004, the game server 302 generates and transmits the request for the game spectator input information at step S1006. As discussed above, the game server 302 may transmit the request for the game spectator input information to the game server 304, the broadcaster 306, or the broadcast interface 110. The game server 304 may transmit the request in accordance with any known procedures and protocols.

Thereafter, game processing of the network game is resumed at step S1008 in accordance with normal game processing, for example, as described with respect to FIG. 6. Additionally or alternatively, the game processing may reconfigure the dummy player or the spectator game screen to correspond to the request for the game spectator input information, which was generated and transmitted by the game server 302. In other words, the rendering instruction initialization processing may be initialized at step S902 of FIG. 9 after execution of the game processing 1000 of FIG. 10. According to such an embodiment, the aspect which is to be controlled by the request may be made viewable to the game spectators 108 via the spectator game screen.

As discussed above, the display interface 110 receives the request for the game spectator input information, directly or indirectly from the game server 302, together with the broadcaster information 712 output by the broadcaster 306. The display interface 110 makes the request and the information available to the game spectators 108 as broadcast game information 718 of the network game, and has a functionality of distributing the broadcast game information 718 to the game spectators 108. The broadcast game information 718 which is made available to the game spectators 108 may include a broadcast stream comprising the spectator game screen, as well as the request for the game spectator input information. The broadcast game information 718 may also include any additional game information described herein, such as, but not limited to, character status information and network game state information. The display interface 110 may comprise a single distribution interface, such as a website, or the display interface 110 may comprise multiple distribution interfaces which comprise a content distribution or delivery network.

In any event, in the embodiment of the disclosure shown in FIG. 7, the display interface 110 is an interface between the game system 102 and the game spectators 108. The game server 302, the rendering server 304, and the broadcaster 306 may not transmit any information or game data to the game spectators 108. The game server 302, the rendering server 304, and the broadcaster 306 also may not receive any information from the game spectators 108, including any inputs from the game spectators 108 in response to the request for the game spectator input information. By this means, the display interface 110 functions as a replacement for, and alternative to, the game client. The display interface 110 may execute software or programming for connecting to the game system 102 or game server 302 to relay the individual inputs of the game spectators 108 or a collective response realized from the inputs. However, the game spectators 108 need not execute the game client or communicate with the game system 102, including the game server 302, the rendering server 304, and the broadcaster 306.

The display interface 110 may provide the broadcast game information 718 to the game spectators 108 via any known and understood methods. For example, the display interface 110 may include a website or portal which the game spectators 108 may access via the network 106 for viewing the broadcast game information 718. In this regard, the display interface 110 may live-stream the broadcast game information 718. Additionally or alternatively, the display interface 110 may provide the broadcast game information 718 as a downloadable object or application. In any event, the display interface 110 provides a medium for broadcasting or transmitting the network game to the game spectators 108, and may include any known content distribution network, system, server, or application which provides the broadcast game information 718 in accordance with any known protocol, format, or standard. The broadcast game information 718 may be transmitted to the game spectators 108 via a unicast transmission or a multicast transmission.

Figure 11:
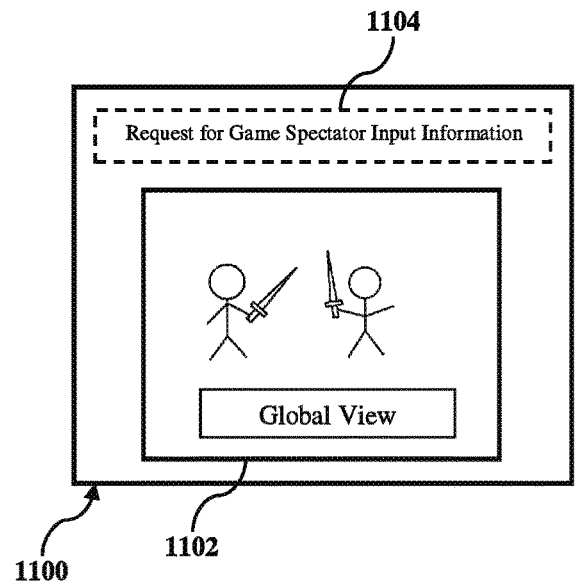
FIG. 11 illustrates an exemplary display screen for controlling a network game in accordance with inputs of game spectators, according to an aspect of the present disclosure.

An exemplary embodiment of the broadcast game information 718 is shown in FIG. 11. The broadcast game information 718 is shown as being displayed on a display screen 1100 of each of the game spectators 108, such as the video display device 212 as described with respect to FIG. 2. The display screen 1100 includes a broadcast stream 1102 of the spectator game screen. The broadcast stream 1102 is shown in FIG. 11 as comprising a global view of a game space or game environment of the network game. The global view may be different than the player game screen of each of the game players 102. Nevertheless, it should be understood that the broadcast stream 1102 may additionally or alternatively comprise any of the views discussed herein. The display screen 1100 is also shown as including a game spectator input section 1104. The game spectator input section 1104 may include a portion which describes the request for the game spectator input information from the game server 302, and a portion which accepts a reply or input from the game spectators 108. The portion of the game spectator input section 1104 which accepts the reply or input from the game spectators 108 may accept a yes-or-no input, a multiple-choice input, an open-ended input, or any other input which is known in the art. Of course, the display screen 1100 of FIG. 11 is merely exemplary and additional displays are available without departing from the scope of the present disclosure.

Figure 12:
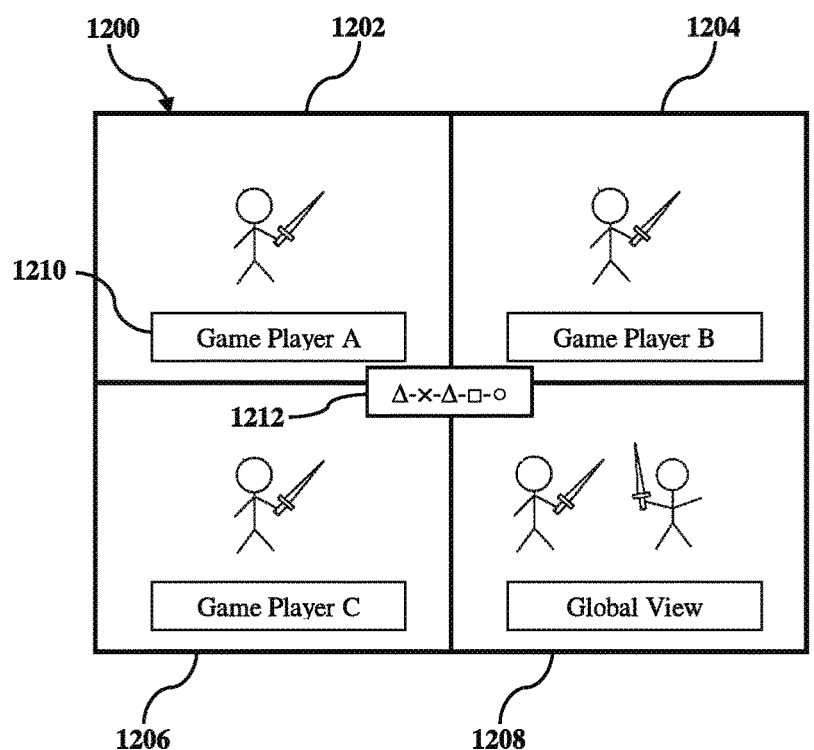
FIG. 12 illustrates an exemplary broadcast stream for controlling a network game in accordance with inputs of game spectators, according to an aspect of the present disclosure.

FIG. 12 shows a further embodiment of the broadcast stream 1102. In this regard, the broadcast game information 718 has generally been described herein in view of the broadcaster 306 providing a single spectator game screen as a single content source to the broadcaster 306. That is, the rendering server broadcast information 710 has generally been described as including a single spectator game screen for each frame of the network game. In such embodiments, the broadcaster 306 may be configured to receive and broadcast a single video source, whereupon the broadcast game information 718 solely includes one spectator game screen as video information. However, in further embodiments of the present disclosure as shown in FIG. 12, for example, the broadcaster 306 may be configured to receive multiple video sources for output to the display interface 110 as the broadcaster information 712.

The broadcast stream of FIG. 12 is generally indicated at 1200 and includes four video sources 1202, 1204, 1206, 1208. The video sources 1202, 1204, 1206, 1208 may correspond to different ones of the game players 104 or any of the other embodiments of the spectator game screen described herein. The game server 302 may manage a separate dummy player or fake client for each of the video sources 1202, 1204, 1206, 1208, and the rendering server broadcast information 710 may comprise four spectator game screens which are separately generated by the rendering server 304 for each frame of the network game. The rendering server 304 may generate each of the spectator game screens in accordance with any of the embodiments described herein, including the game processing 900 as generally shown in FIG. 9. The broadcaster 306 may receive the spectator game screens and compile or combine the multiple spectator game screens as the broadcaster information 712 for display by the display interface 110 as a single spectator game stream. While FIG. 12 shows four video sources 1202, 1204, 1206, 1208, it should be appreciated that additional embodiments of the present disclosure may include any number of video sources.

Accordingly, the rendering server broadcast information 710 which is generated by the rendering server 304 and transmitted to the broadcaster 306 and display interface 110 for broadcasting to the game spectators 108 is not limited to a single video source, or to a single spectator game screen for each frame of the network game. The rendering server broadcast information 710 may include a plurality of spectator game screens which are generated for a frame of the network game. Moreover, while the game server broadcast information 714 is described above as including audio information, the game server broadcast information 714 is not limited to including audio information and may additionally or alternatively include any game data. For example, the game server broadcast information 714 may include the request for the game spectator input information, menu data for the game players 104, or a status of the network game. FIG. 12 shows menu data 1210 as being included for each of the video sources 1202, 1204, 1206, 1208. The broadcaster 306 may be configured to receive the menu data 1210 from the game server 302 as the game server broadcast information 714, and to superimpose the menu data onto any of the video sources 1202, 1204, 1206, 1208. Alternatively, the broadcaster 306 may be configured to receive the menu data as additional data or video sources. An output format of the broadcaster 306 may be configured to include any combination and configuration of data and video source inputs from the game server 302 and the rendering server 304, as generally understood in the art.

The game server broadcast information 714 is also not limited to including the request for the game spectator input information, menu data for the game players 104, or status information of the network game. In further embodiments of the present disclosure, the game server broadcast information 714 may include an operation input 1212 of any of the game players 104, as generally received at step S602 of FIG. 6. In other words, the game server broadcast information 714 may include the controller input information 702 of the game players 104. The game server broadcast information 714 may even include dummy or fake controller inputs for the dummy player or fake client which are managed by the game server 302 for moving the dummy player or fake client in the game space or game environment. As a result, the network game system 700 may function as a learning or teaching tool for instructing the game spectators 108 how to play the network game. The game spectators 108 may apply the learned knowledge in controlling the aspect of the network game, such as, for example, in controlling the dummy player.

The network game system 700 may display the operation input 1212 for any one of the game players 104 of the network game in the display screen 1100, or for any combination of game players 104 of the network game. The network game system 700 may further switch amongst the game players 104 for displaying the operation input 1212 in the display screen 1100. For example, the game server 302 may transmit the operation input 1212 for one of the game players 104 as the game server broadcast information 714 for display in the display screen 1100. Thereafter, in response to a predetermined event occurring in the network game, the game server 302 may transmit the operation input 1212 for another one of the game players 104 as the game server broadcast information 714 for display in the display screen 1100. The predetermined event may include for example, one of the game players 104 executing an attack, performing a combination, performing a finishing move, or any other event which may occur in a network game. According to such embodiments, the operation input 1212 may be displayed in the display screen 1100 for events which are most likely of interest to the game spectators 108.

The broadcaster 306 may be configured to receive the operation input 1212 from the game server 302 as the game server broadcast information 714, and to superimpose the data onto any of the video sources 1202, 1204, 1206, 1208 of FIG. 12. The operation input 1212 may identify or be associated with the one of the game players 104 to which the input corresponds. Alternatively, the operation input 1212 may be displayed without association or anonymously. Moreover, while a single set of operation input 1212 is shown in FIG. 12, it should be understood that multiple sets of input may also be included within the broadcast game information 718.

Any of the above-mentioned rendering server broadcast information 710, game server broadcast information 714, and the game spectator input section 1104 including the request for the game spectator input information may be configured to be freely available to all game spectators 108 in the broadcast game information 718 or the display screen 1100. That is, the broadcaster 306 and the display interface 110 may be configured to freely display each of the data and video source inputs to all of the game spectators 108. However, in further embodiments of the present disclosure, any of the data and video source inputs may require that a condition be satisfied before being displayed by the display interface 110 to the game spectators 108, such as when displayed to the game spectators 108 via unicast transmissions. For example, the display interface 110 may require that the game spectators 108 complete an authentication or log-in process before displaying certain ones of the data and video source inputs of the broadcast game information 718 or the display screen 1100. Additionally or alternatively, the display interface 110 may require that the game spectators 108 submit a payment or complete a task before certain ones of the data and video source inputs of the broadcast game information 718 or the display screen 1100 are displayed. In other words, any combination of the data and video source inputs of the broadcast game information 718 or the display screen 1100 described herein may be displayable to or viewable by less than all of the game spectators 108.

The broadcast game information 718 and the display screen 1100 are viewable to the game spectators 108 such that they may view the network game, learn from the operation input 1212, control the aspect of the network game, and experience any of the additional features and advantages described herein.

In controlling the aspect of the network game, the game spectators 108 transmit spectator input information 720 to the display interface. The spectator input information 720 is submitted in response to the request for the game spectator input information, which is relayed to the game spectators by the display interface 110 from the game server 302. As generally discussed above, the spectator input information 720 may comprise a yes-or-no input, a multiple-choice input, an open-ended input, or any other input which is submitted to the display interface 110. The spectator input information 720 may be submitted via a keyboard, mouse, touch-screen, controller, voice-recognition software, or any other input device or means which is understood in the art.

Figure 13:
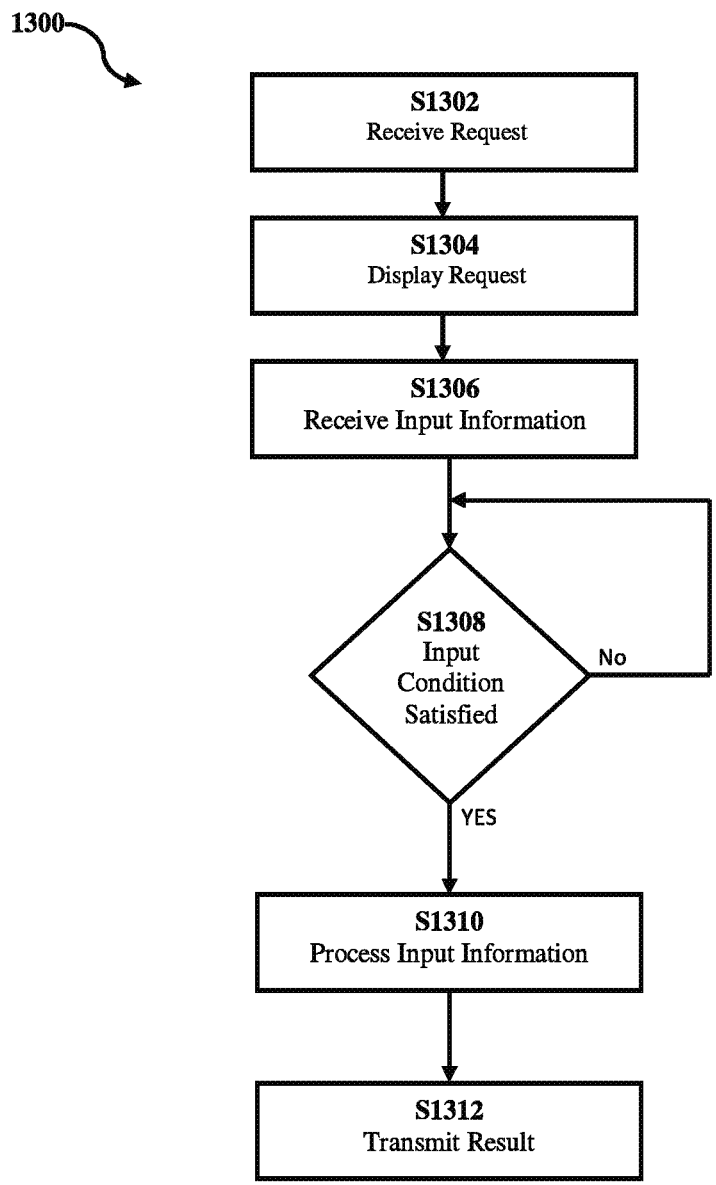
FIG. 13 shows a flowchart of an exemplary game process for receiving inputs of game spectators for controlling a network game in accordance with the inputs, according to an aspect of the present disclosure.

The display interface 110 receives and processes the spectator input information 720 from the game spectators 108. An exemplary embodiment of game processing for receiving and processing the spectator input information 720 is generally shown in FIG. 13 at 1300. The display interface 110 receives the request for the game spectator input information at step S1302. The request may be received directly or indirectly from the game server 302 in accordance with any of the embodiments described herein. The display interface 110 displays the request together with the spectator game screen at step S1304. The request and spectator game screen may also be displayed in accordance with any of the embodiments described herein. Thereafter, the display interface 110 receives the spectator input information 720 from the game spectators 108. The display interface 110 may receive the spectator input information 720 from a single game spectator 108 or from a plurality of game spectators 108.

The display interface 110 determines whether an input condition is satisfied at step S1308. For example, the condition may be to determine whether the input information is received from a single game spectator 108. Alternatively, the request for the game spectator input information may be associated with a particular time frame. The game server 302 may determine the timeframe in accordance with the request, or the time frame may be a predetermined period. In any event, the display interface may receive the spectator input information 720 from the game spectators 108 until the expiration of the time frame. According to such an embodiment, the request is only valid for a predetermined period. In this regard, the aspect of the network game which is to be controlled by the request may comprise a non-latent feature so that the game spectators 108 are given ample opportunity to provide the spectator input information 720. This allows the display interface 110 to receive the spectator input information 720 from a significant number of the game spectators 108 to provide quality control and ensure a response which is representative of the masses.

In further embodiments, the condition at step S1308 may include the spectator input information 720 being received from a predetermined number of the game spectators. The condition may additionally or alternatively include an even in the network game. For example, the display interface 110 may receive the spectator input information 720 from the game spectators 108 until a battle begins or ends, up to when a character enters or clears an area, until a game start time or end time, or in accordance with any other game event. Of course, these examples are merely exemplary and the input condition at step S1308 may comprise any additional or alternative condition which is understood in the art, such as, but not limited to, the spectator input information 720 being received from a predetermined percentage of the game spectators 108 or a predetermined period elapsing from which the last piece of spectator input information 720 was received by the display interface 110.

After the input condition has been satisfied and the display interface has received the spectator input information 720 from the game spectators 108, the display interface may process the spectator input information 720 to determine a game spectator input information result 722 to be transmitted to the game server 302 at step S1310. The display interface may determine the game spectator input information result in accordance with a most frequent piece of spectator input information 720, a first received piece of spectator input information 720, a last received piece of spectator input information 720, a mean or median piece of spectator input information 720, or in accordance with any other method or procedure known in the art. Nevertheless, the display interface 110 generally determines a reply or answer to the request for game spectator input information at step S1310. The display interface 110 transmits, to the game server 302, the reply or answer to the request as the game spectator input information result 722 at step S1312, whereupon the game server controls the aspect of the network game in accordance with the game spectator input information result 722.

Accordingly, the game server 302 requests that the game spectators 108 control an aspect of the network game by providing game spectator input information. The request is transmitted directly or indirectly from the game server 302 to the display interface. The display interface displays the request together with the spectator game screen, and receives and processes the spectator input information 720 received from the game spectators 108 in response to the request. The display interface 108 transmits the determined game spectator input information result 722 to the game server 302, and the game server 302 controls the aspect of the network game in accordance with the game spectator input information result 722. According to such an embodiment, the game server 302 does not transmit any game information to the game spectators 108. The game server 302 also does not receive any of the spectator input information 720 from the game spectators 108, but rather, merely receives a collective or collaborative response from the display interface 108. Nevertheless, it should be understood that the display interface 110 may transmit the spectator input information 720 to the game server 302 in further embodiments of the present disclosure, wherein the game server may perform the processing described with respect to step S1310 of FIG. 13 to determine the game spectator input information result 722 for controlling the aspect of the network game.

According to further embodiments of the present disclosure, as shown by FIGS. 14-17, various methods for controlling a network game in accordance with an input of at least one game spectator. The methods may be computer-implemented or implemented in accordance with any other known hardware or software which is capable of executing a set of instructions, steps, or features, sequentially or otherwise.

Figure 14:
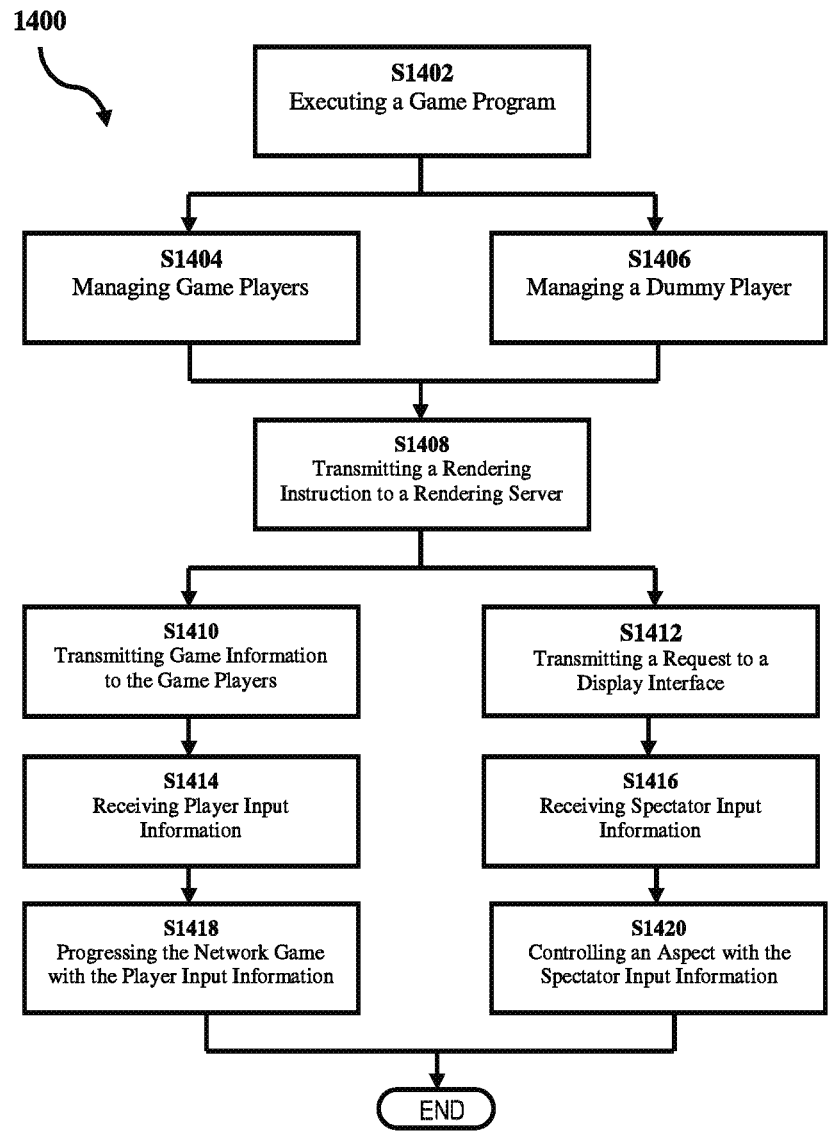
FIG. 14 shows an exemplary method of a game server of a network game system for controlling a network game in accordance with inputs of game spectators, according to an aspect of the present disclosure.

FIG. 14 shows an exemplary method of the game server 302 of FIG. 7. The method is generally shown at 1400. The game server 302 executes a game program at step S1402. The game server 302 may execute the game program, for example, when the network game begins, when the game server 302 is activated, or when the controller input information 702 is received from the game players 104. The game server 302 manages game player information at step S1404. The game server 302 may create or update the game player information in accordance with the game process 600 of FIG. 6, or in accordance with any of the other embodiments described herein. The game server 302 further manages dummy player information at step S1406. The game server 302 may create the dummy player information in accordance with the game process 800 of FIG. 8, update the dummy player information in accordance with the game process 600 of FIG. 6, reconfigure the dummy player information in accordance with the game process 900 of FIG. 9, or manage the dummy player information in accordance with any of the other embodiments described herein. The game server 302 generates and transmits the rendering instruction 704, including game information on a progress of the network game, to the rendering server 304 at step S1408. The game information may include the managed game player information, the managed dummy player information, and/or any additional information. The game server 302 transmits network game information to the game players at step S1410, and transmits the game spectator information request 716 to the broadcast interface 110 at step S1412. The network game information which is transmitted to the game players 104 at step S1410 may include, for example, the audio information 708 as described with respect to FIG. 7. Moreover, the network game information may also be transmitted to the game broadcaster 306 during step S1410. Thereafter, player input information is received from the game players 104 at step S1414, and spectator input information is received from the broadcast interface 110 at step S1416. The player input information may include, for example, the controller input information 702 as described with respect to FIG. 7. The spectator input information may include, for example, the game spectator input information result 722 as described with respect to FIG. 7. The game server 302 progresses the network game in accordance with the player input information at step S1418, and also controls an aspect of the network game in accordance with the spectator input information at step S1420. The processing may thereafter be ended or resumed at step S1402 in accordance with, for example, each frame of the network game. Of course, the method of FIG. 14 is merely exemplary and may additionally or alternatively include any of the features described with respect to the game server 302 herein.

Figure 15:
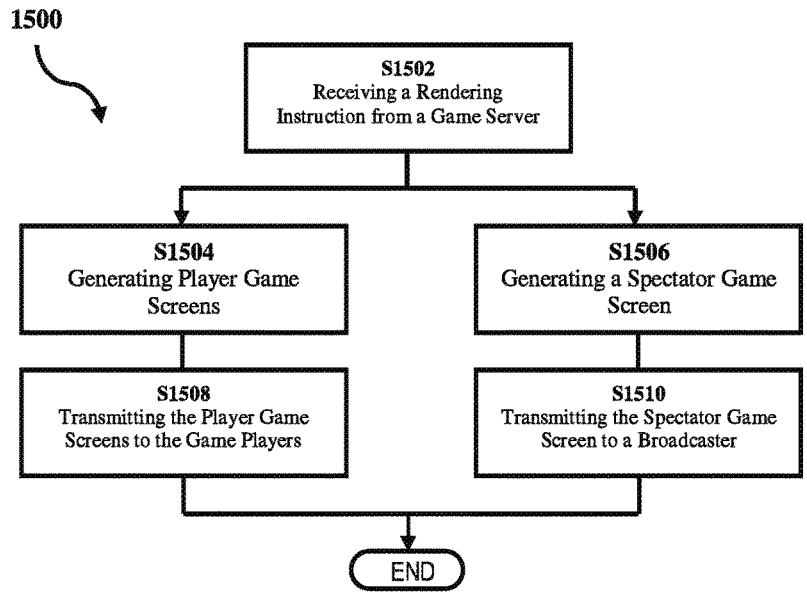
FIG. 15 shows an exemplary method of a rendering server of a network game system for broadcasting a network game to a plurality of game spectators, according to an aspect of the present disclosure.

FIG. 15 shows an exemplary method of the rendering server 304 of FIG. 7. The method is generally shown at 1500. The rendering server 304 receives the rendering instruction 704, including the game information, at step S1502. The request for the game spectator input information may further be received at step S1502 in additional embodiments of the present disclosure. The rendering server 304 generates the player game screens at step S1504, and generates the spectator game screen at step S1506. The rendering server 304 may generate the player game screens and the spectator game screen in accordance with any of the embodiments described herein. The rendering server 304 transmits the player game screens to the game players 104 at step S1508, and transmits the spectator game screen to the broadcaster 306 at step S1510. The request for the game spectator input information may also be transmitted to the broadcaster at step S1510. Thereafter, processing may end or be restarted. The processing may, for example, be executed each frame of the network game. Of course, the method of FIG. 15 is merely exemplary and may additionally or alternatively include any of the features described with respect to the rendering server 304 herein.

Figure 16:
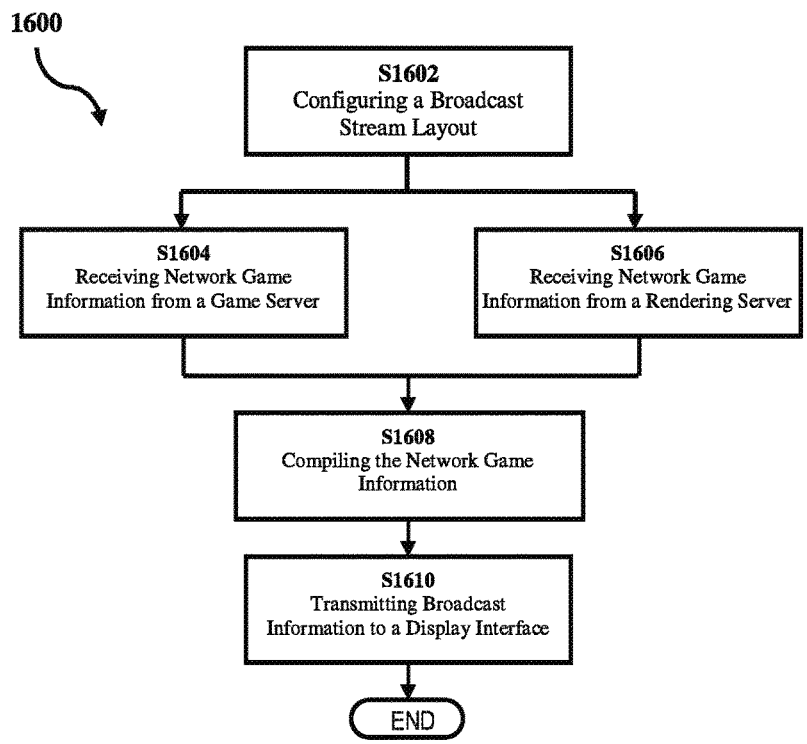
FIG. 16 shows an exemplary method of a broadcaster of a network game system for controlling a network game in accordance with inputs of game spectators, according to an aspect of the present disclosure.

FIG. 16 shows an exemplary method of the broadcaster 306 of FIG. 7. The method is generally shown at 1600. The broadcaster 306 may initially be configured to define a broadcast stream layout including any combination of audio, data, and video sources at step S1602. The broadcaster 306 receives network game information from the game server 302 at step S1604, and receives network game information from the rendering server 304 at step S1604. The network game information which is received from the game server 302 at step S1604 may include, for example, the game server broadcast information 714 as described with respect to FIG. 7 and also the request for the game spectator input information. The network game information which is received from the rendering server 304 at step S1606 may include, for example, the rendering server broadcast information 710 as described with respect to FIG. 7. The broadcaster 306 compiles the network game information received from the game server 302 and the rendering server 304 at step S1608, and transmits broadcast information, such as the network game broadcast information 712 as described with respect to FIG. 7, to the display interface 110 at step S1610. Thereafter, processing may end or be restarted. The processing may, for example, be executed each frame of the network game. Of course, the method of FIG. 16 is merely exemplary and may additionally or alternatively include any of the features described with respect to the broadcaster 306 herein.

Figure 17:
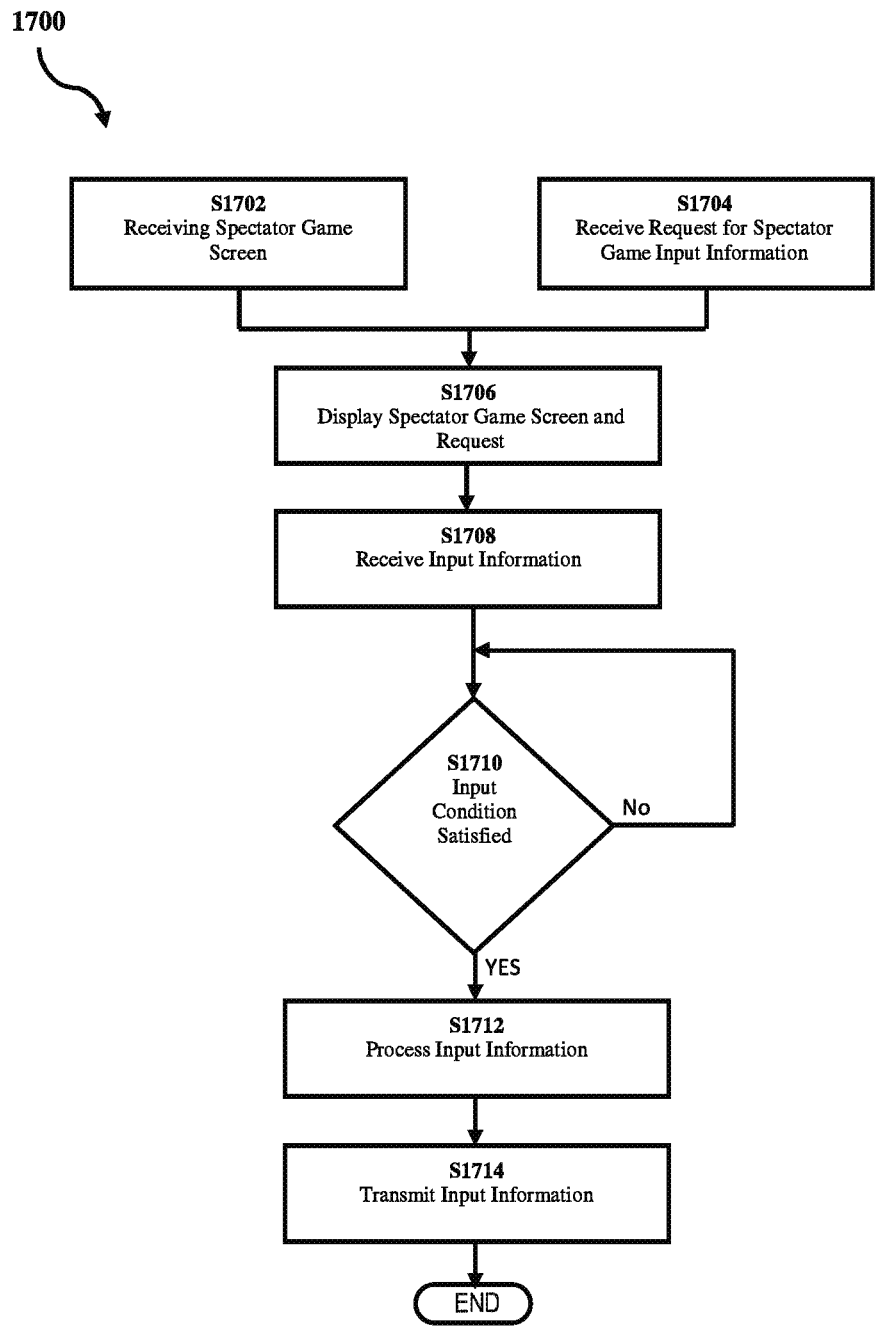
FIG. 17 shows an exemplary method of a display interface of a network game system for controlling a network game in accordance with inputs of game spectators, according to an aspect of the present disclosure.

FIG. 17 shows an exemplary method of the display interface 110 of FIG. 7. The method is generally shown at 1700. The display interface 110 receives the spectator game screen from the broadcaster 306 at step S1702 and receives the request for game spectator input information directly or indirectly from the server 302 at step S1704. The display interface 110 displays the spectator game screen and the request at step S1706 and receives input information from the game spectators 108 in response to the request at step S1708. Thereafter, the display interface 110 determines whether an input condition for the input information from the game spectators 108 is satisfied at step S1710. The condition may include any of the conditions described with respect to step S1308 of FIG. 13 or any additional conditions which are known in the art. Upon determining that the input condition is satisfied, the display interface 110 process the input information at step S1712 and transmits the result to the game server 302 at step S1714. The result may include, for example, the game spectator input information result 722 as described with respect to FIG. 7. Thereafter, processing may end or be restarted. The processing may, for example, be executed each frame of the network game. Of course, the method of FIG. 17 is merely exemplary and may additionally or alternatively include any of the features described with respect to the display interface 110 herein.

Although systems, methods, and media for broadcasting a network game to a plurality of game spectators have been described with reference to several exemplary embodiments, it is understood that the words that have been used are words of description and illustration, rather than words of limitation. Changes may be made within the purview of the appended claims, as presently stated and as amended, without departing from the scope and spirit of the systems, methods, and media for broadcasting a network game to a plurality of game spectators in their aspects.

Although systems, methods, and media for broadcasting a network game to a plurality of game spectators have been described with reference to particular means, materials and embodiments, the systems, methods, and media are not intended to be limited to the particulars disclosed; rather the systems, methods, and media for broadcasting a network game to a plurality of game spectators extend to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an," "the," etc. is not to be construed as limiting the element to the singular.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A game system for controlling a network game in accordance with an input of at least one game spectator, the game system comprising:
 a game server that controls a progress of the network game in accordance with controller input information received from at least one game player and game spectator input information received from the at least one game spectator;
 a rendering server that receives game information from the game server, the game information including player information for the at least one game player and dummy information for a dummy player, the rendering server generating at least one player game screen for the at least one game player using the player information and generating a spectator game screen for the at least one game spectator using the dummy information, the at least one player game screen being transmitted to the at least one game player for display; and
 a broadcaster that receives the spectator game screen from the rendering server and transmits the spectator game screen to a display interface, the display interface being accessible to the at least one game spectator for viewing the spectator game screen,
 wherein the display interface displays a request for the game spectator input information in association with the spectator game screen, the game spectator input information being received from the at least one game spectator via the display interface, the game server controls an aspect of the network game in accordance with the game spectator input information received via the display interface, the at least one game player executes a game client that establishes a connection with the game system for transmitting the controller input information to the network interface, and the at least one game spectator does not execute the game client.

2. The game system according to claim 1, wherein the game server creates and manages the dummy player in a same manner as the at least one game player.

3. The game system according to claim 2, wherein the game server generates controller input information for the dummy player for moving the dummy player in the network game, the dummy information for the dummy player being generated in accordance with the controller input information generated for the dummy player.

4. The game system according to claim 3, wherein the dummy information for generating the spectator game screen is not distinguishable from the player information for generating the at least one player game screen, by the rendering server.

5. The game system according to claim 4, wherein the game server creates the dummy player in correspondence with an object in the network game for minimizing computations in the network game.

6. The game system according to claim 1, wherein the game server, the rendering server, and the broadcaster do not transmit any game data to the at least one game spectator.

7. The game system according to claim 1, wherein the game server, the rendering server, and the broadcaster do not receive an input of the game spectator input information from the at least one game spectator.

8. The game system according to claim 1, wherein
the spectator game screen is a global view of a game space of the network game, and
the global view is different than the at least one player game screen of the at least one game player.

9. The game system according to claim 8, wherein the game server does not generate controller input information for the dummy player for moving the dummy player in the network game.

10. The game system according to claim 1, further comprising:
the display interface that receives the spectator game screen from the broadcaster and displays the request for the game spectator input information, the display interface displaying the spectator game screen in association with the request for the game spectator input information.

11. The game system according to claim 10, wherein
the display interface is accessible via a network,
the display interface receives inputs from a plurality of game spectators in response to the request for the game spectator input information, and
one of the game server and the display interface processes the inputs according to a predetermined criteria to determine the game spectator input information.

12. The game system according to claim 11, wherein the display interface provides a unicast transmission including the spectator game screen and the game spectator input information to each of the plurality of game spectators.

13. The game system according to claim 12, wherein the display interface provides the unicast transmission to each of the plurality of game spectators in response to each of the plurality of game spectators satisfying a predetermined condition.

14. The game system according to claim 11, wherein the display interface simultaneously provides a multicast transmission including the spectator game screen and the game spectator input information to each of the plurality of game spectators.

15. The game system according to claim 1, wherein
the network interface receives inputs from a plurality of game spectators in response to the request for the game spectator input information, and
the processor processes the inputs according to a predetermined criteria to determine the game spectator input information.

16. The game system according to claim 1, wherein
the request for the game spectator input information is valid for a predetermined period, and
the predetermined period is defined by at least one of a predetermined timeframe and a predetermined number of spectator inputs.

17. The game system according to claim 1, wherein
the game spectator input information is received by the network interface via a website, and
the website receives an input of the at least one game spectator as the game spectator input information.

18. The game system according to claim 1, wherein
each of the at least one game player controls a player character in the network game, and
each of the at least one game spectator does not control any character in the network game.

19. A method for controlling a network game hosted by a game system in accordance with an input of at least one game spectator, the method comprising:
controlling, by a game server, a progress of the network game in accordance with controller input information received from at least one game player and game spectator input information received from the at least one game spectator;
receiving, by a rendering server, game information from the game server, the game information including player information for the at least one game player and dummy information for a dummy player;
generating, by the rendering server, at least one player game screen for the at least one game player using the player information, the at least one player game screen being transmitted to the at least one game player for display;
generating, by the rendering server, a spectator game screen for the at least one game spectator using the dummy information; and
receiving, by a broadcaster, the spectator game screen from the rendering server and transmitting the spectator game screen to a display interface, the display interface being accessible to the at least one game spectator for viewing the spectator game screen,
wherein the display interface displays a request for the game spectator input information in association with the spectator game screen, the game spectator input information being received from the at least one game spectator via the display interface,
the game server controls an aspect of the network game in accordance with the game spectator input information received via the display interface, the at least one game player executes a game client that establishes a connection with the game system for transmitting the controller input information to the network interface, and the at least one game spectator does not execute the game client.

20. A non-transitory computer-readable medium including a program for controlling a network game hosted by a game system in accordance with an input of at least one game spectator, the program, when executed by at least one processor of the game system, causing the game system to perform operations comprising:

controlling, by a game server, a progress of the network game in accordance with controller input information received from at least one game player and game spectator input information received from the at least one game spectator;

receiving, by a rendering server, game information from the game server, the game information including player information for the at least one game player and dummy information for a dummy player;

generating, by the rendering server, at least one player game screen for the at least one game player using the player information, the at least one player game screen being transmitted to the at least one game player for display;

generating, by the rendering server, a spectator game screen for the at least one game spectator using the dummy information; and receiving, by a broadcaster, the spectator game screen from the rendering server and transmitting the spectator game screen to a display interface, the display interface being accessible to the at least one game spectator for viewing the spectator game screen, wherein the display interface displays a request for the game spectator input information in association with the spectator game screen, the game spectator input information being received from the at least one game spectator via the display interface, the game server controls an aspect of the network game in accordance with the game spectator input information received via the display interface, the at least one game player executes a game client that establishes a connection with the game system for transmitting the controller input information to the network interface, and the at least one game spectator does not execute the game client.

* * * * *